(12) United States Patent
Spiro

(10) Patent No.: US 11,129,339 B2
(45) Date of Patent: Sep. 28, 2021

(54) AUTOMATED VERTICAL PLANT CULTIVATION SYSTEM

(71) Applicant: Daniel S. Spiro, Scottsdale, AZ (US)

(72) Inventor: Daniel S. Spiro, Scottsdale, AZ (US)

( * ) Notice: Subject to any disclaimer, the term of this patent is extended or adjusted under 35 U.S.C. 154(b) by 294 days.

(21) Appl. No.: 15/973,212

(22) Filed: May 7, 2018

(65) Prior Publication Data

US 2018/0325038 A1    Nov. 15, 2018

Related U.S. Application Data

(63) Continuation-in-part of application No. 15/885,157, filed on Jan. 31, 2018, which is a continuation-in-part
(Continued)

(51) Int. Cl.
| | | |
|---|---|---|
| *A01G 7/04* | (2006.01) | |
| *A01G 9/02* | (2018.01) | |
| *A01G 9/20* | (2006.01) | |
| *A01G 31/06* | (2006.01) | |
| *A01G 9/24* | (2006.01) | |
| *A01G 27/00* | (2006.01) | |

(Continued)

(52) U.S. Cl.
CPC .............. *A01G 9/022* (2013.01); *A01G 7/045* (2013.01); *A01G 9/0293* (2018.02); *A01G 9/045* (2013.01); *A01G 9/047* (2013.01); *A01G 9/20* (2013.01); *A01G 9/24* (2013.01); *A01G 9/247* (2013.01); *A01G 9/249* (2019.05); *A01G 27/001* (2013.01); *A01G 27/003* (2013.01); *A01G 29/00* (2013.01); *A01G 31/06* (2013.01); *A01G 2031/006* (2013.01)

(58) Field of Classification Search
CPC ........ A01G 31/06; A01G 9/0293; A01G 7/00; A01G 7/045; A01G 9/047; A01G 9/0297; A01G 9/0295; A01G 9/022; A01G 9/045; A01G 2031/006
IPC ....................... A01G 31/06,7/045, 9/002, 9/047
See application file for complete search history.

(56) References Cited

U.S. PATENT DOCUMENTS

| | | |
|---|---|---|
| 1,560,436 A | 11/1925 | Staples |
| 3,030,735 A | 4/1962 | Bodkins |

(Continued)

FOREIGN PATENT DOCUMENTS

| | | |
|---|---|---|
| CA | 2859165 | 6/2013 |
| CN | 103416292 | 12/2013 |

(Continued)

*Primary Examiner* — Monica L Barlow
(74) *Attorney, Agent, or Firm* — Barnes & Thornburg LLP; Irina N. Sullivan; Michael Carrillo

(57) ABSTRACT

An automated plant cultivation system is provided having multi-tiered vertically arranged horizontal magazine structures each employing seed or plant capsules with a fluid circulation and illumination and communication network controlled by an on-board processor. Particularly, the system includes a magazine structure having seed/plant capsules within seed/plant reservoirs alternately arranged between at least one of a light source substantially concealed from direct viewing. A fluid channel extends across a long axis of the magazine structure, wherein the magazine structure is adapted for use of seed/plant capsules with nutrient composite plant growth cultivation, hydroponic plant growth cultivation, aeroponic plant growth cultivation methods or combinations thereof.

10 Claims, 26 Drawing Sheets

Related U.S. Application Data of application No. 15/589,845, filed on May 8, 2017, now Pat. No. 10,524,433.

(60) Provisional application No. 62/592,246, filed on Nov. 29, 2017.

(51) Int. Cl.
*A01G 29/00* (2006.01)
*A01G 9/04* (2006.01)
*A01G 9/029* (2018.01)
*A01G 31/00* (2018.01)

(56) References Cited

U.S. PATENT DOCUMENTS

| | | | |
|---|---|---|---|
| 4,295,296 A | 10/1981 | Kinghorn | |
| 4,845,602 A | 7/1989 | Lehocki | |
| 5,524,387 A | 6/1996 | Whisenant | |
| 6,061,957 A | 5/2000 | Takashima | |
| 6,105,309 A | 8/2000 | Takayanagi | |
| 6,134,832 A | 10/2000 | Bokmiller et al. | |
| 6,536,159 B1 | 3/2003 | Van Den ende | |
| 8,549,788 B2 | 10/2013 | Bryan | |
| 9,775,330 B1 | 10/2017 | Chen | |
| 9,974,252 B2 | 5/2018 | Aykroyd et al. | |
| 2003/0145519 A1 | 8/2003 | Winsbury | |
| 2004/0110279 A1 | 6/2004 | Everett | |
| 2007/0199241 A1 | 8/2007 | Peleszezak | |
| 2008/0092442 A1 | 4/2008 | Singer | |
| 2008/0222949 A1 | 9/2008 | Bissonnette | |
| 2010/0146854 A1 | 6/2010 | Cannon | |
| 2011/0219689 A1 | 9/2011 | Hodson-Walker | |
| 2012/0019382 A1 | 1/2012 | Kohler et al. | |
| 2012/0054061 A1 | 3/2012 | Fok | |
| 2012/0144740 A1 | 6/2012 | Igarashi | |
| 2012/0260569 A1* | 10/2012 | Golgotiu | A01G 9/247 47/65 |
| 2013/0074408 A1 | 3/2013 | Singh | |
| 2013/0255146 A1 | 10/2013 | Lehman | |
| 2013/0294065 A1 | 11/2013 | Wells | |
| 2014/0000162 A1 | 1/2014 | Blank | |
| 2014/0115958 A1* | 5/2014 | Helene | A01G 31/06 47/17 |
| 2014/0318012 A1 | 10/2014 | Fujiyama | |
| 2015/0000191 A1 | 1/2015 | Nagadome | |
| 2015/0223402 A1* | 8/2015 | Krijn | A01G 7/045 47/58.1 LS |
| 2015/0223418 A1 | 8/2015 | Collins et al. | |
| 2016/0037737 A1 | 2/2016 | Fingerle | |
| 2016/0135395 A1 | 5/2016 | Umpstead | |
| 2016/0192606 A1 | 7/2016 | Karbowski | |
| 2016/0316645 A1 | 11/2016 | Neufeld | |
| 2016/0345518 A1 | 12/2016 | Collier | |
| 2016/0360712 A1 | 12/2016 | Yorio | |
| 2017/0071143 A1 | 3/2017 | Newsam | |
| 2017/0079223 A1 | 3/2017 | Cheng | |
| 2017/0105372 A1 | 4/2017 | Bryan | |
| 2017/0202164 A1 | 7/2017 | Dufresne | |
| 2018/0042192 A1 | 2/2018 | Volpe | |
| 2018/0103599 A1 | 4/2018 | Zhan | |
| 2019/0246584 A1 | 8/2019 | Hsueh | |

FOREIGN PATENT DOCUMENTS

| | | |
|---|---|---|
| CN | 104584924 | 5/2015 |
| FR | 2322573 | 4/1977 |
| JP | 2016539662 | 12/2016 |
| KR | 20120015684 | 2/2012 |
| KR | 20120042304 | 5/2012 |
| WO | WO 2015/072076 | 5/2015 |
| WO | WO 2016/027409 | 2/2016 |
| WO | WO 2017/024353 | 2/2017 |

* cited by examiner

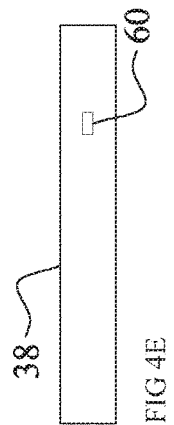
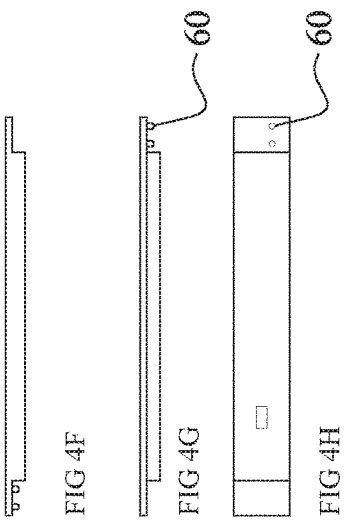
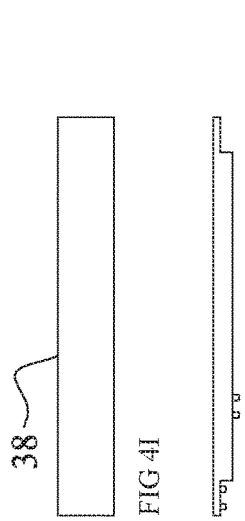
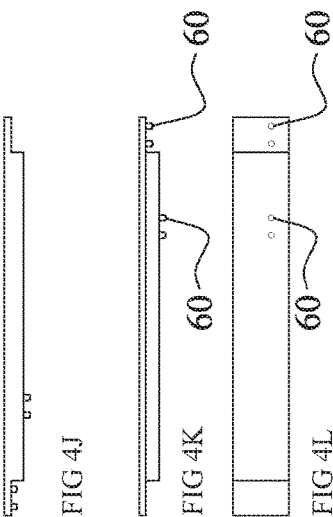
FIG 4E
FIG 4F
FIG 4G
FIG 4H
FIG 4I
FIG 4J
FIG 4K
FIG 4L
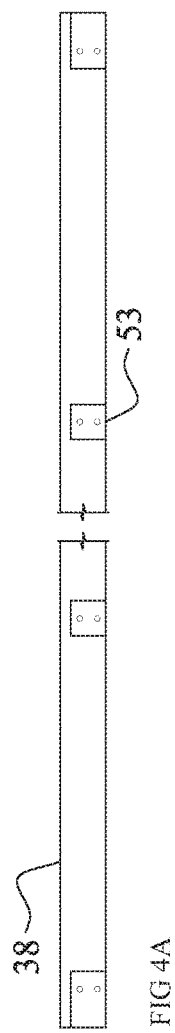
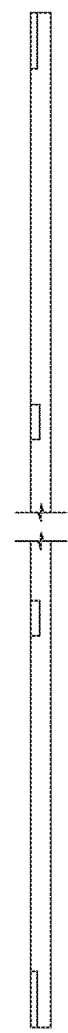
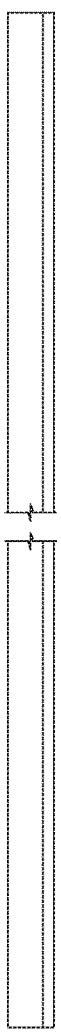
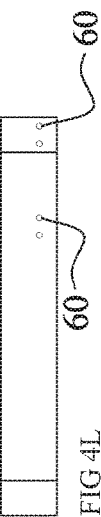
FIG 4A
FIG 4B
FIG 4C
FIG 4D

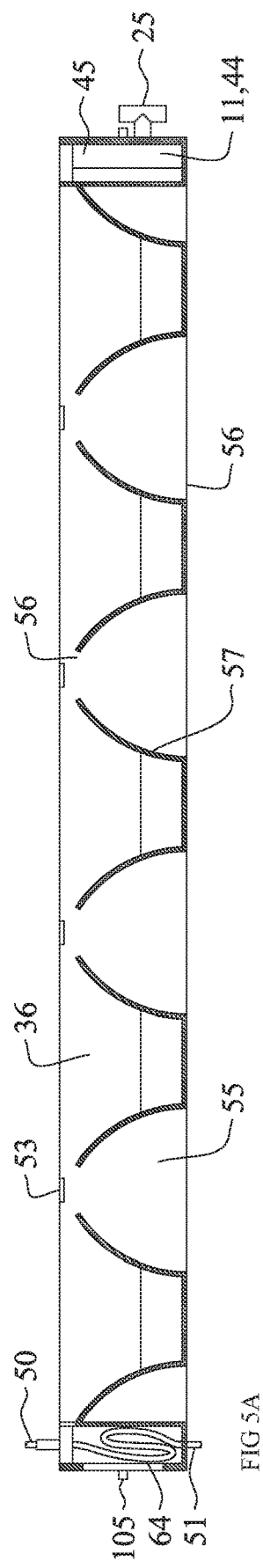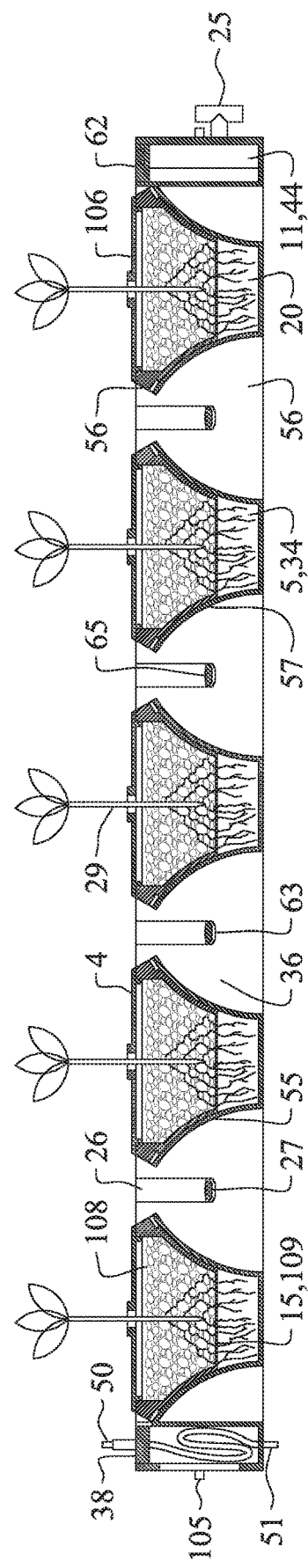
FIG 5A
FIG 5B

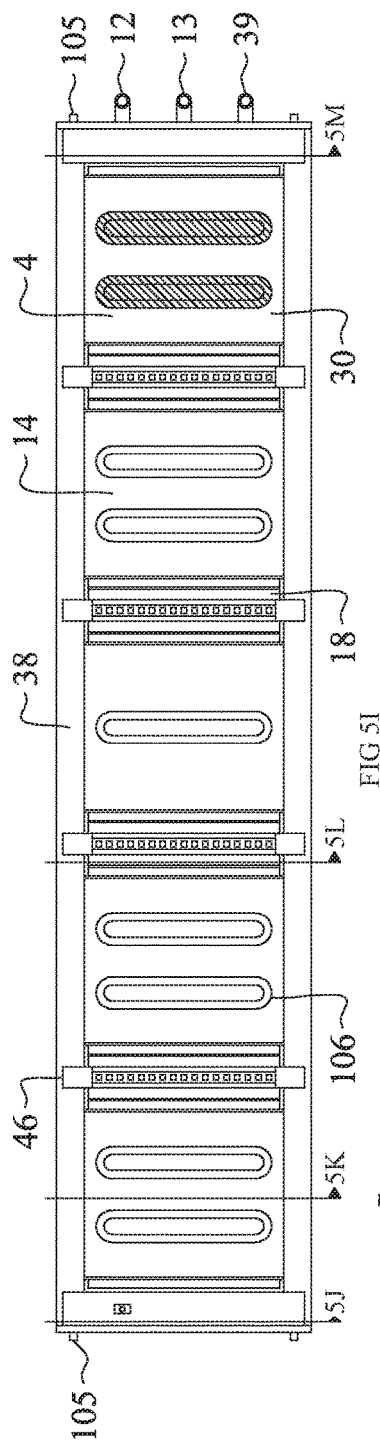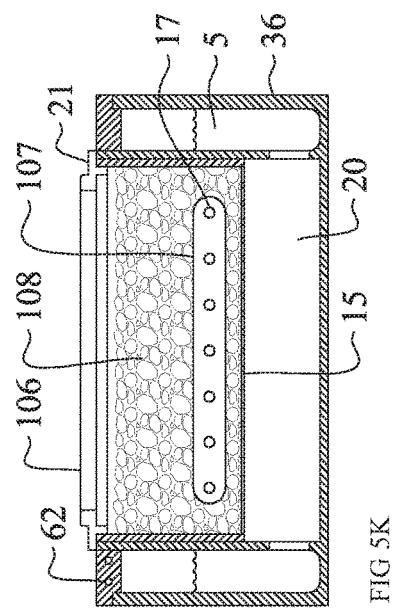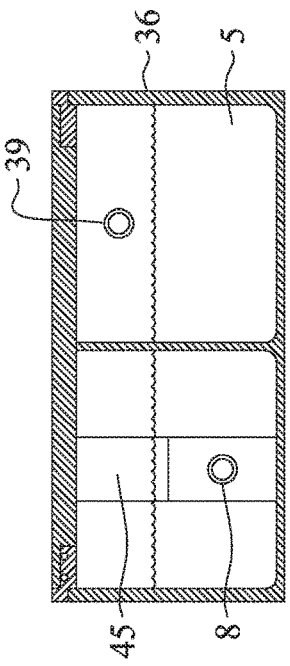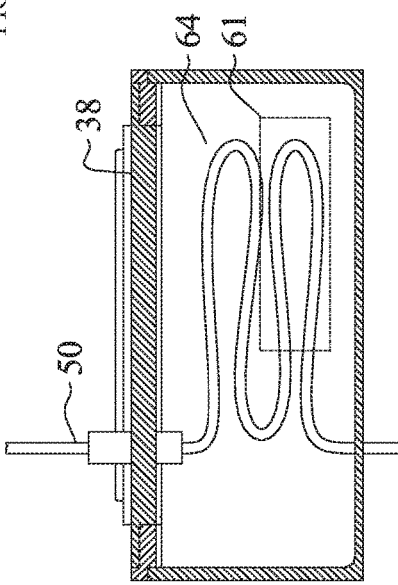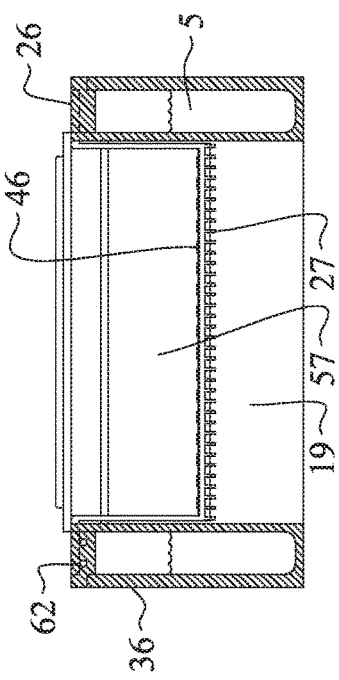

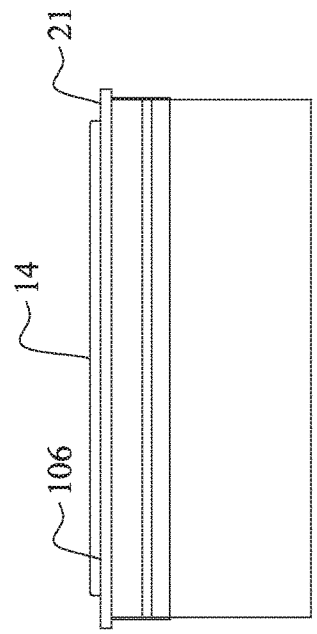
FIG 6A
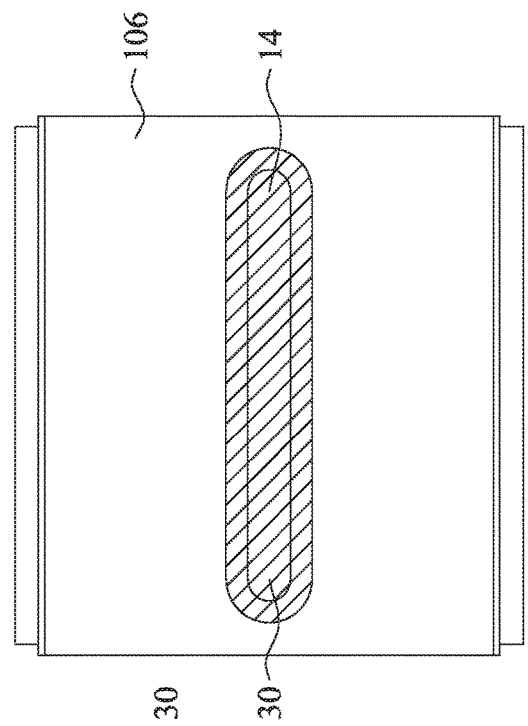
FIG 6B
FIG 6C
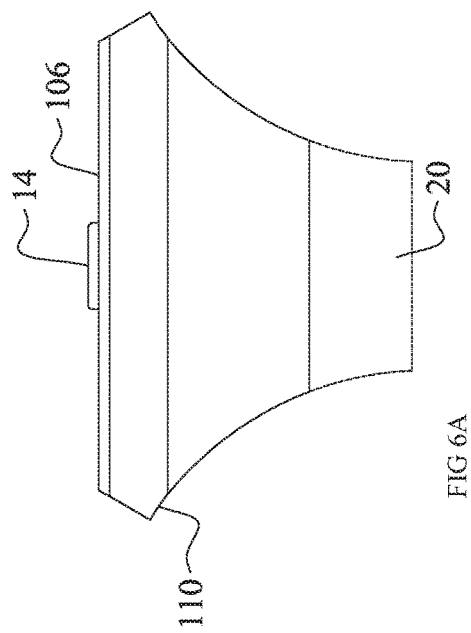
FIG 6D
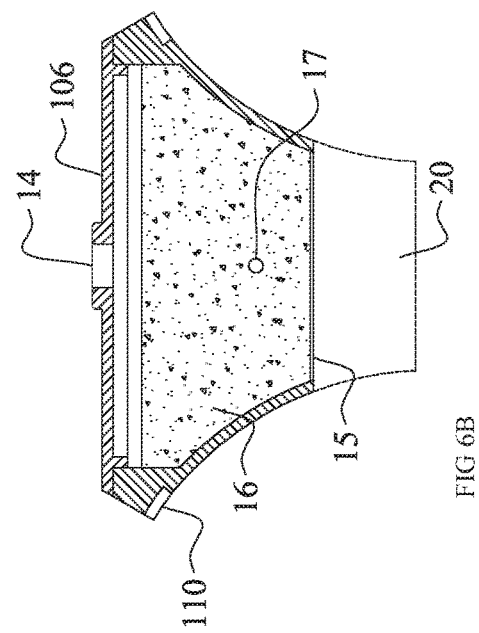
FIG 6E
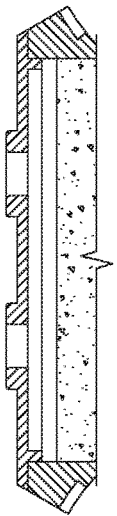

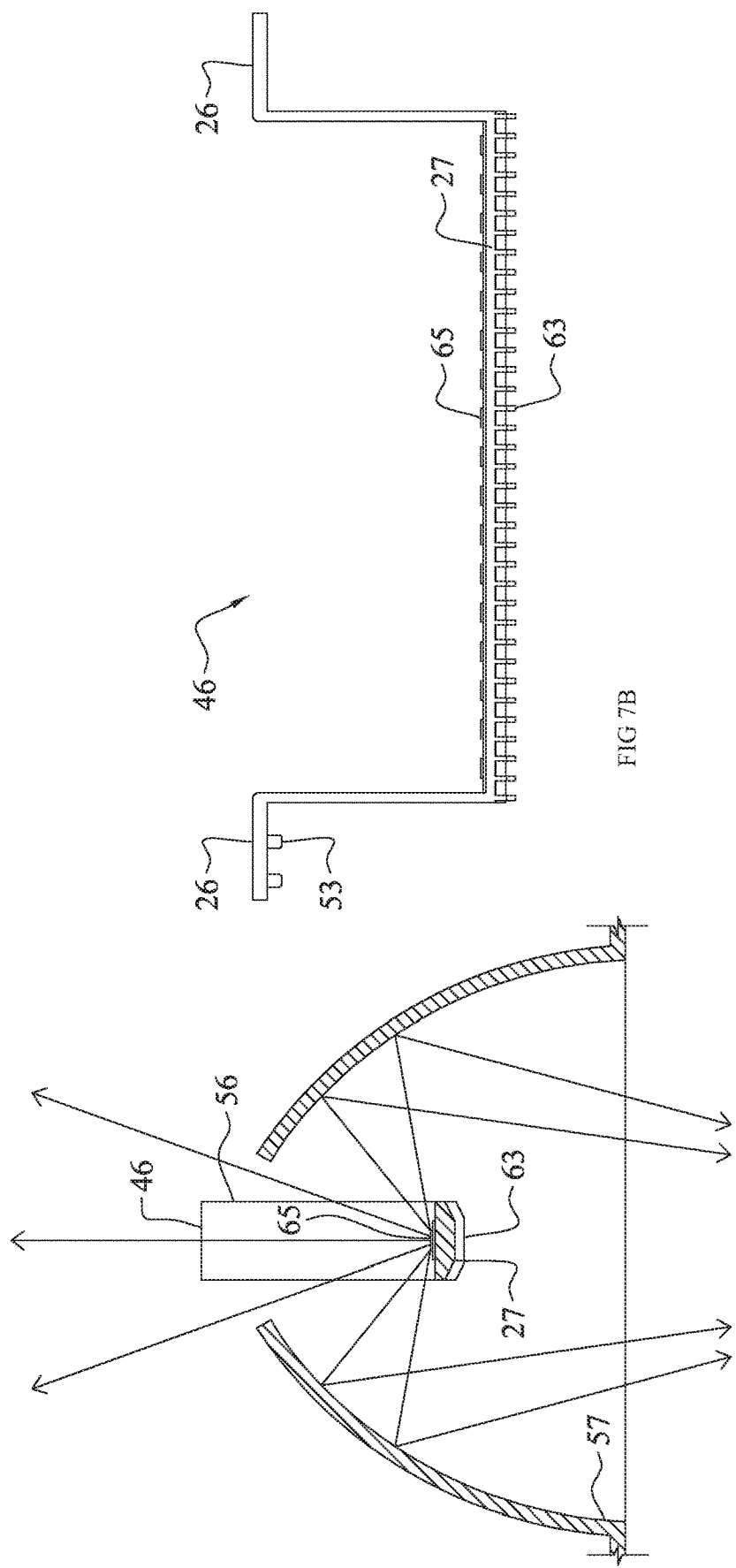

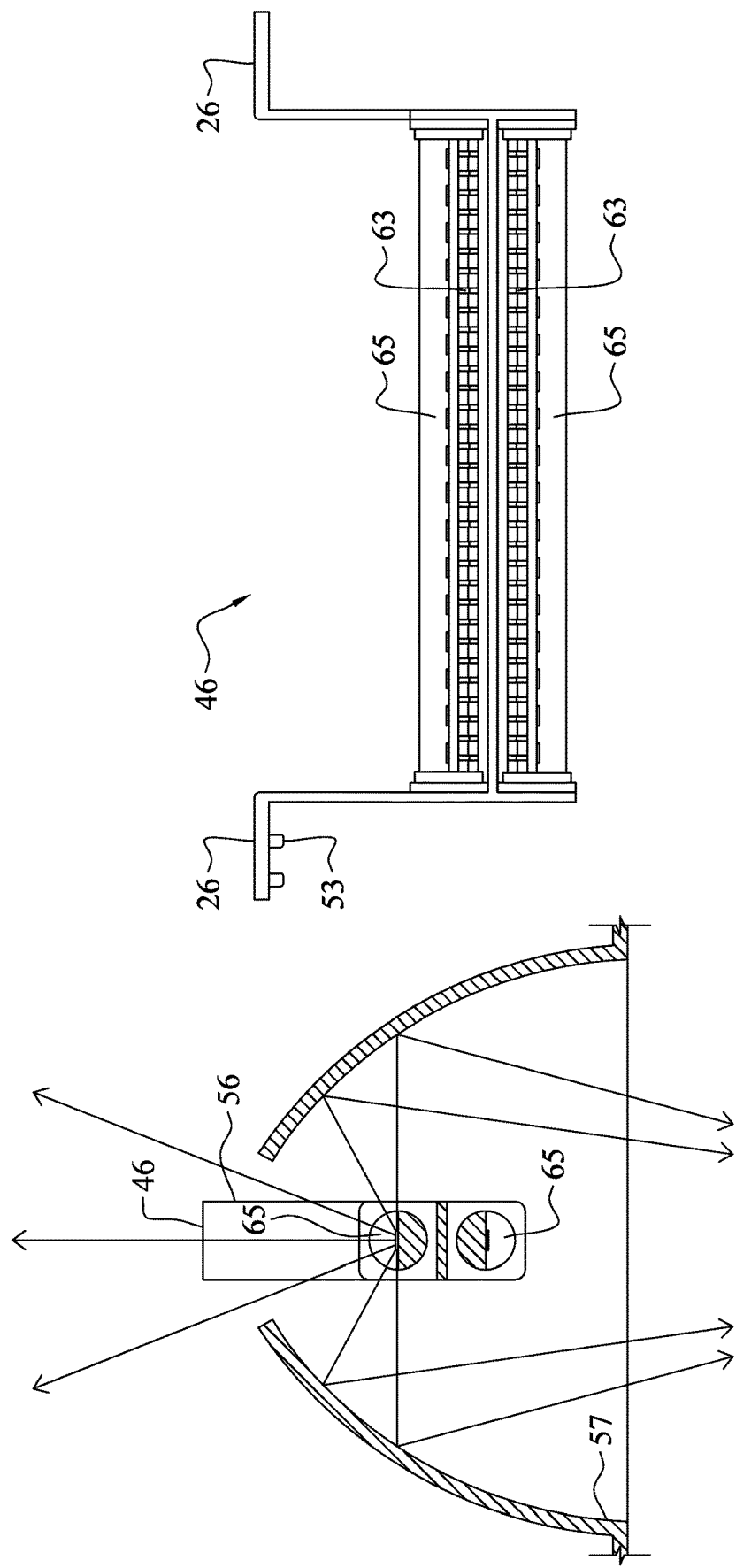

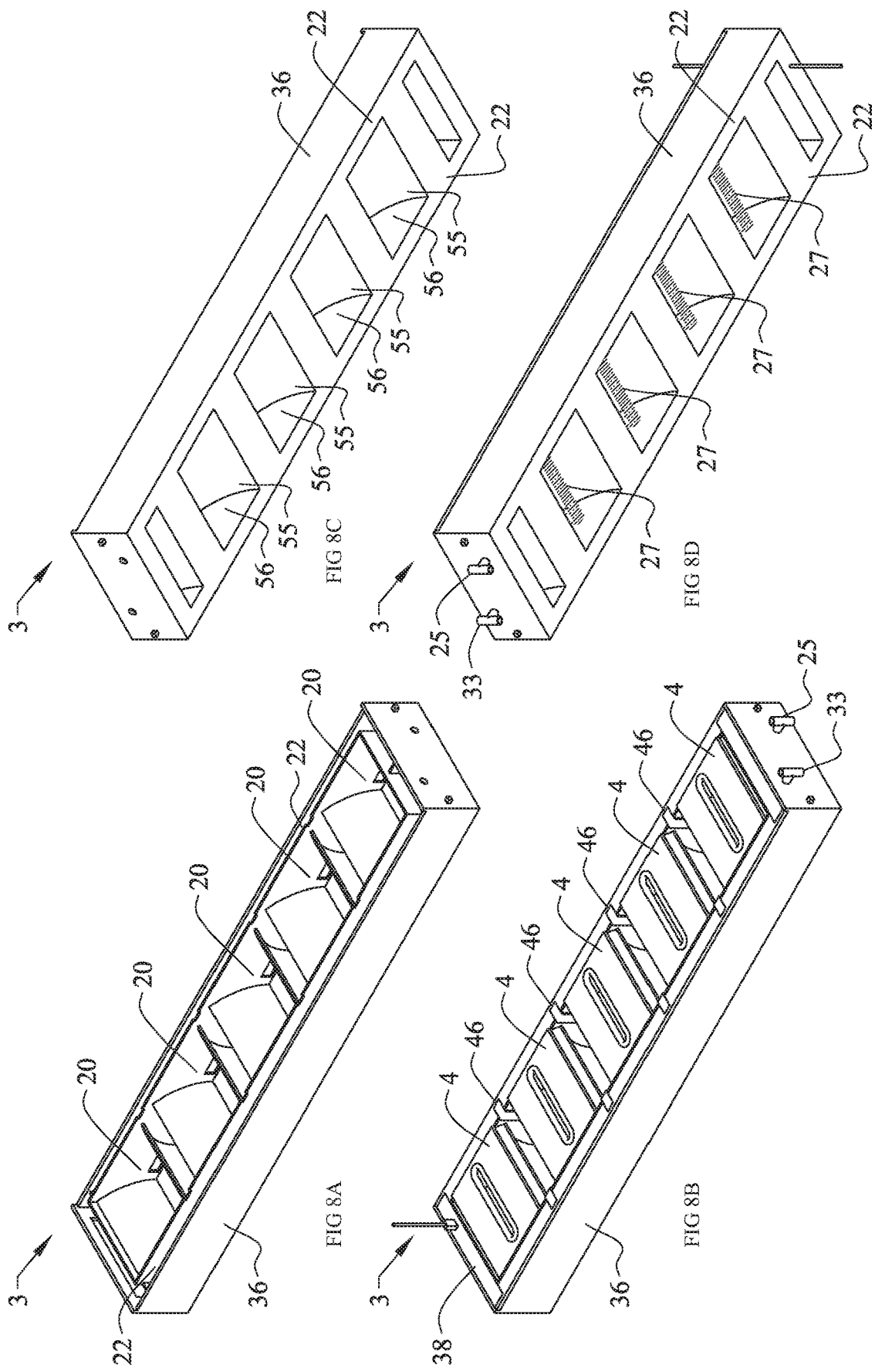

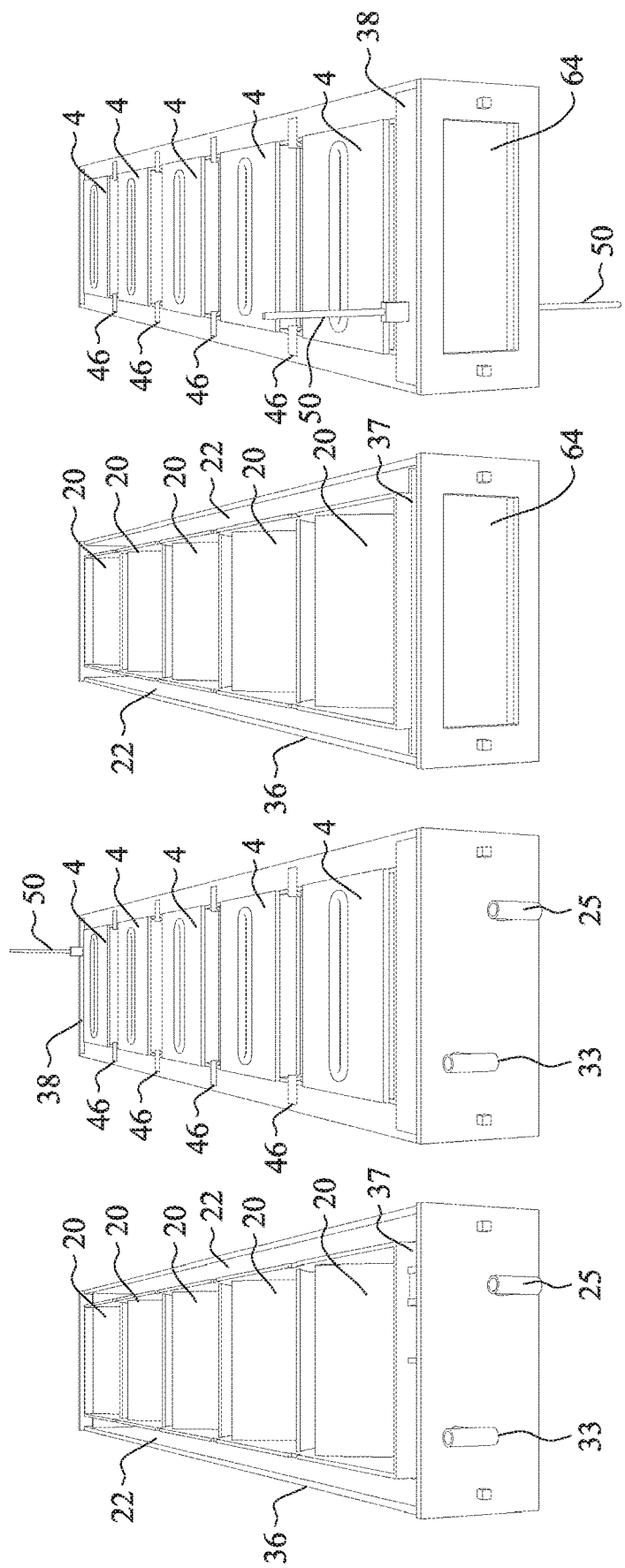

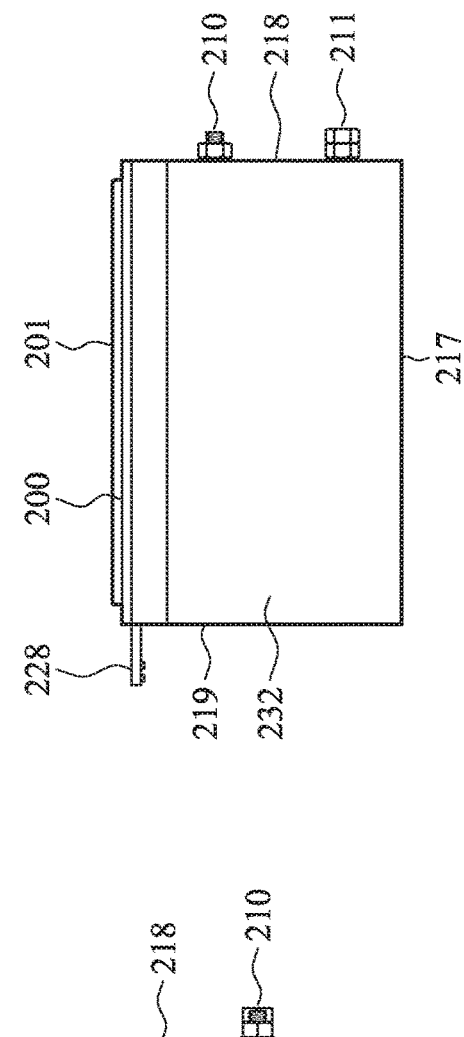
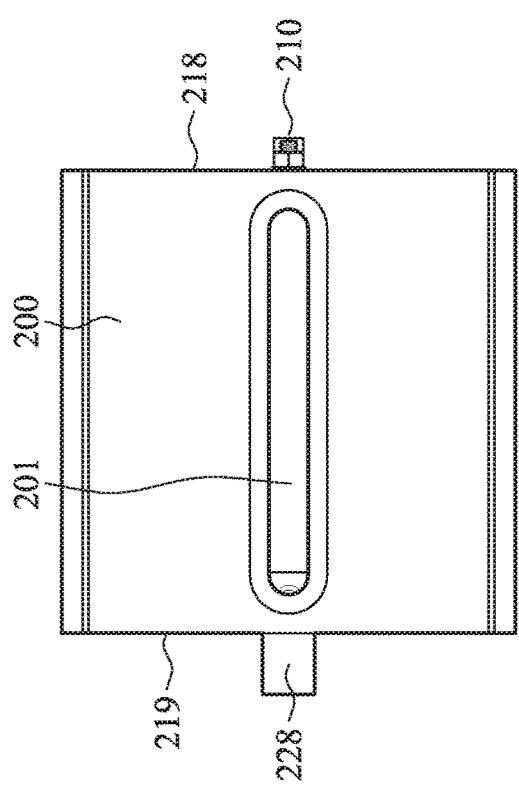
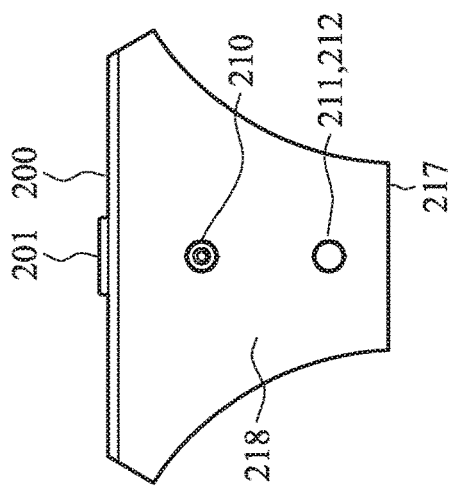
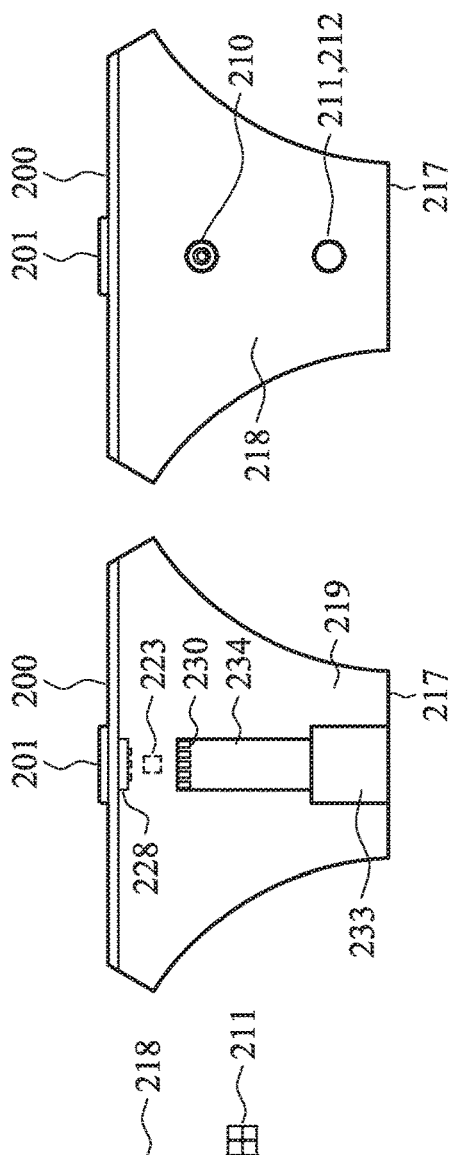
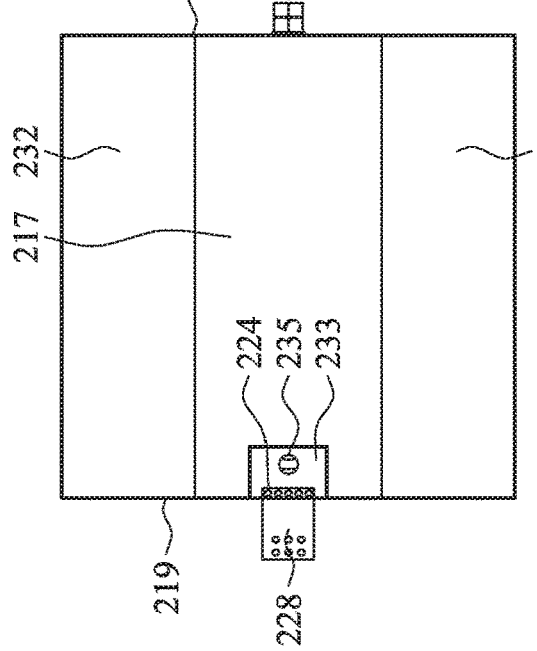

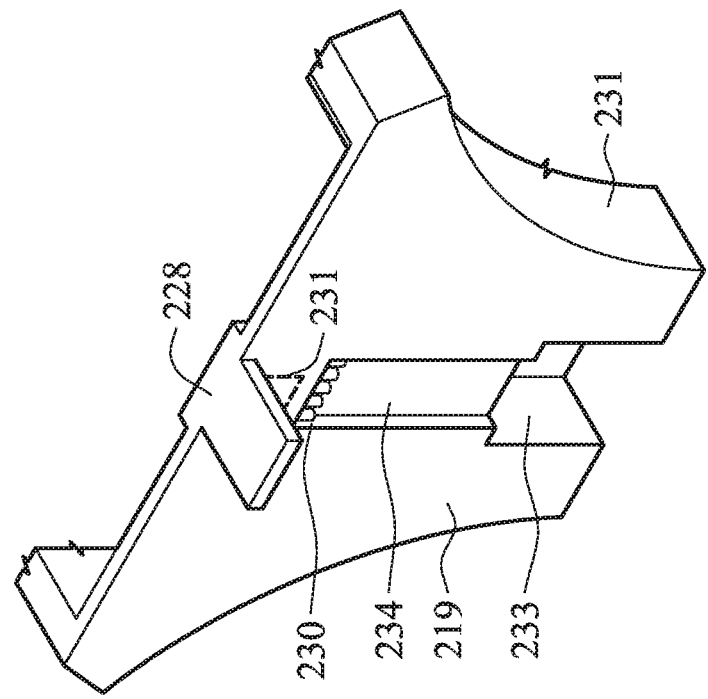
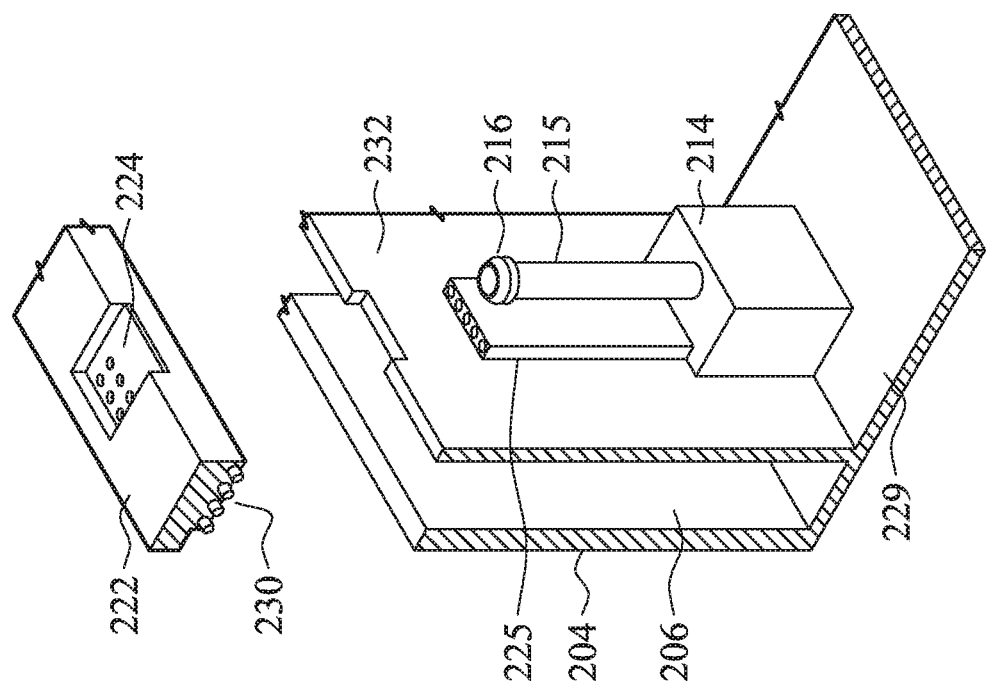
FIG 13B
FIG 13A

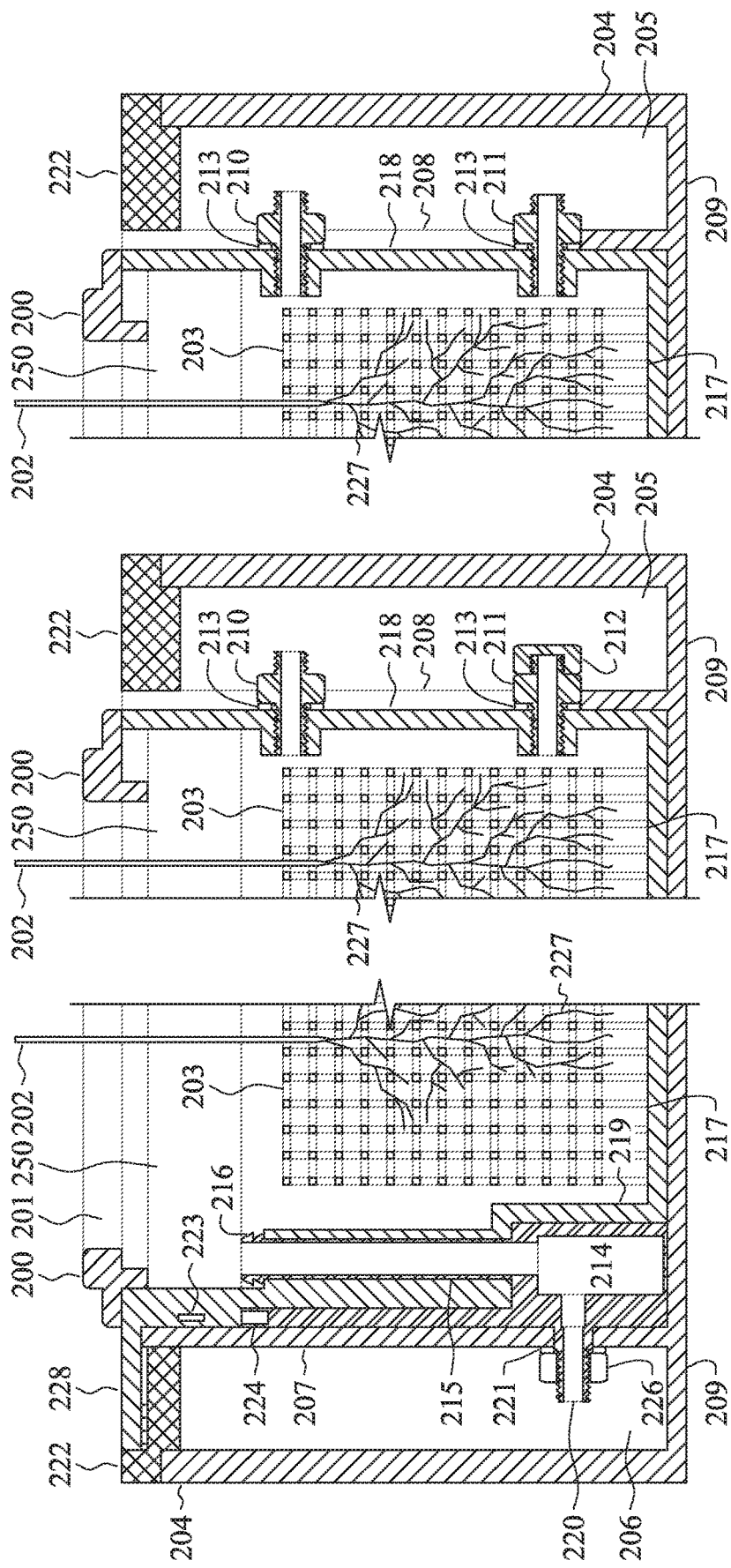

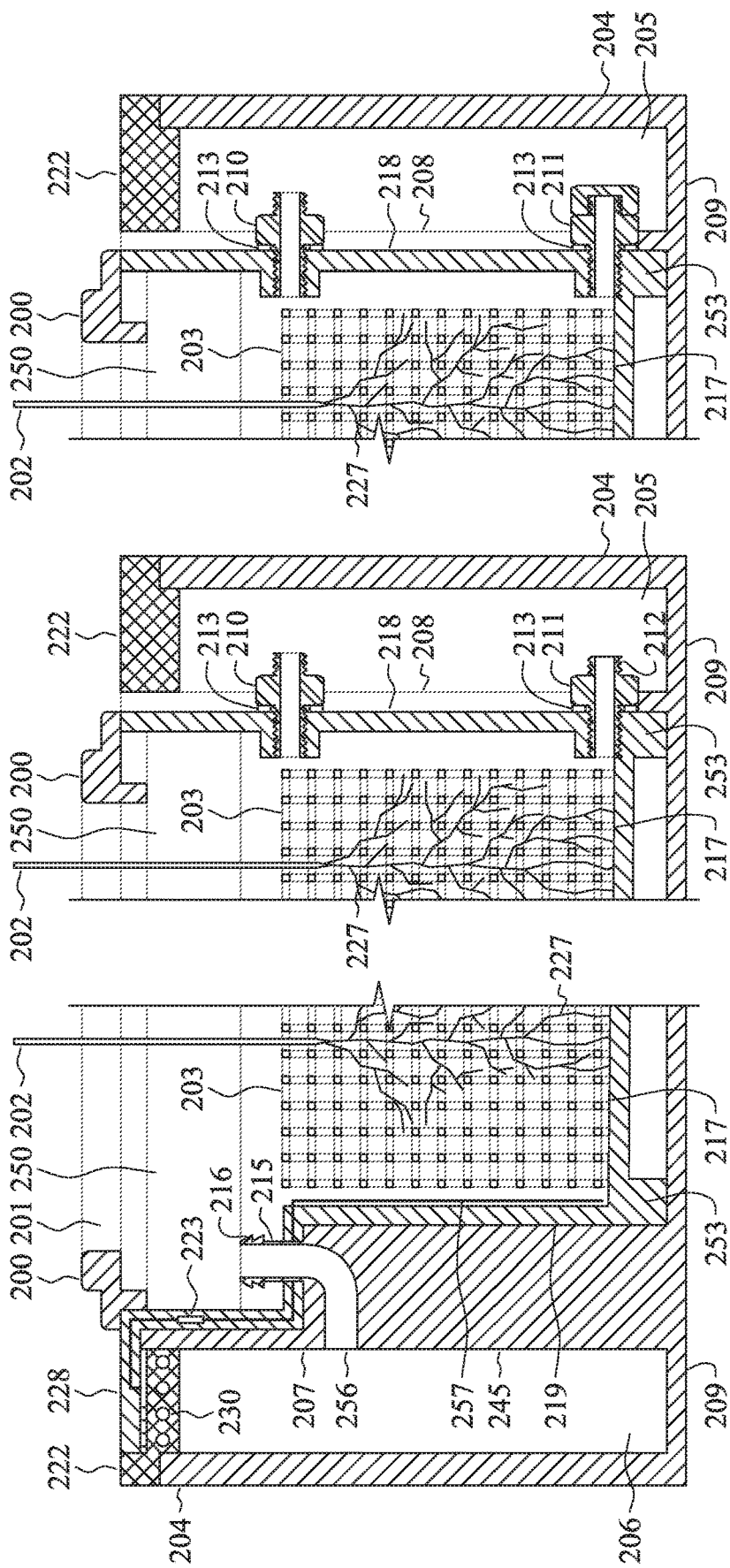

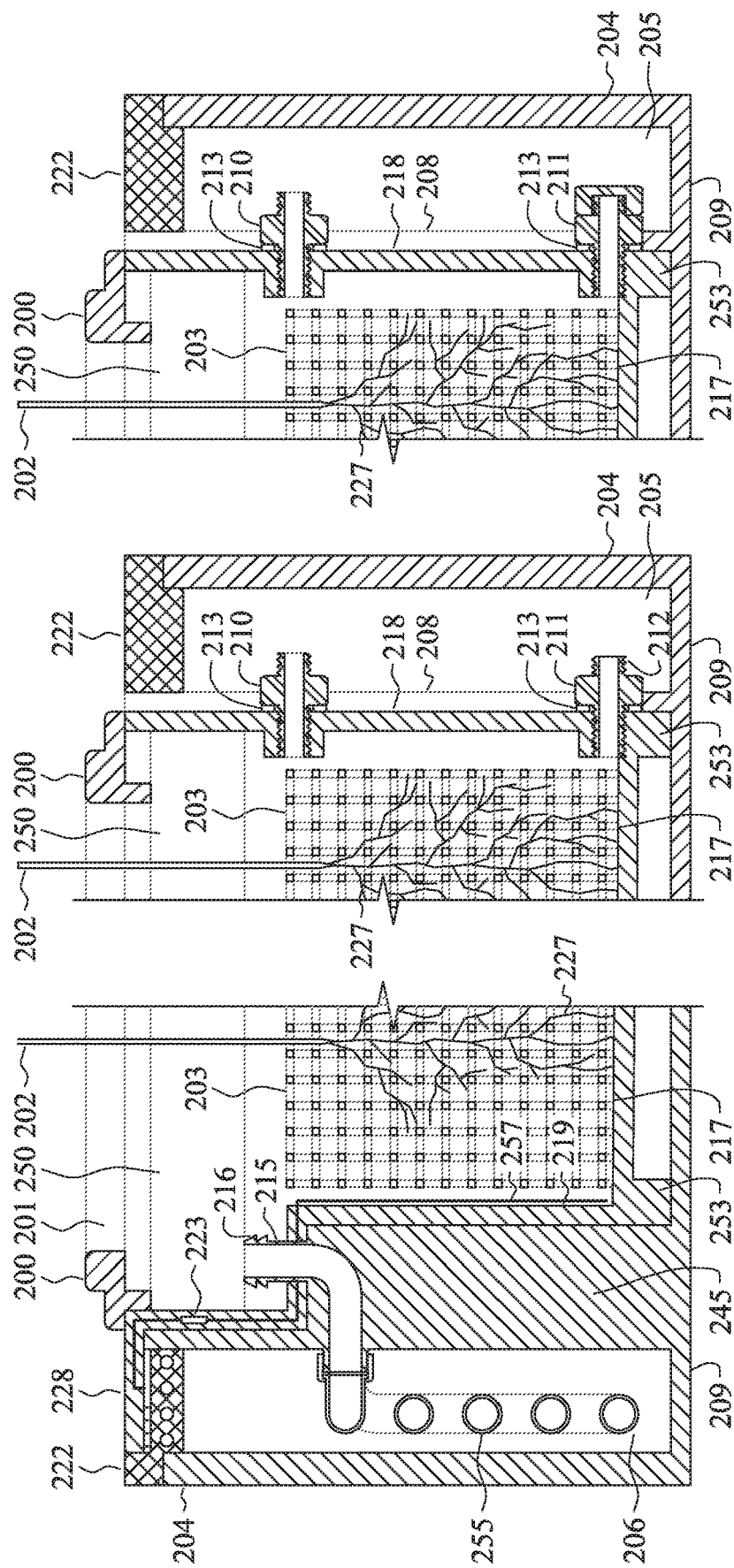

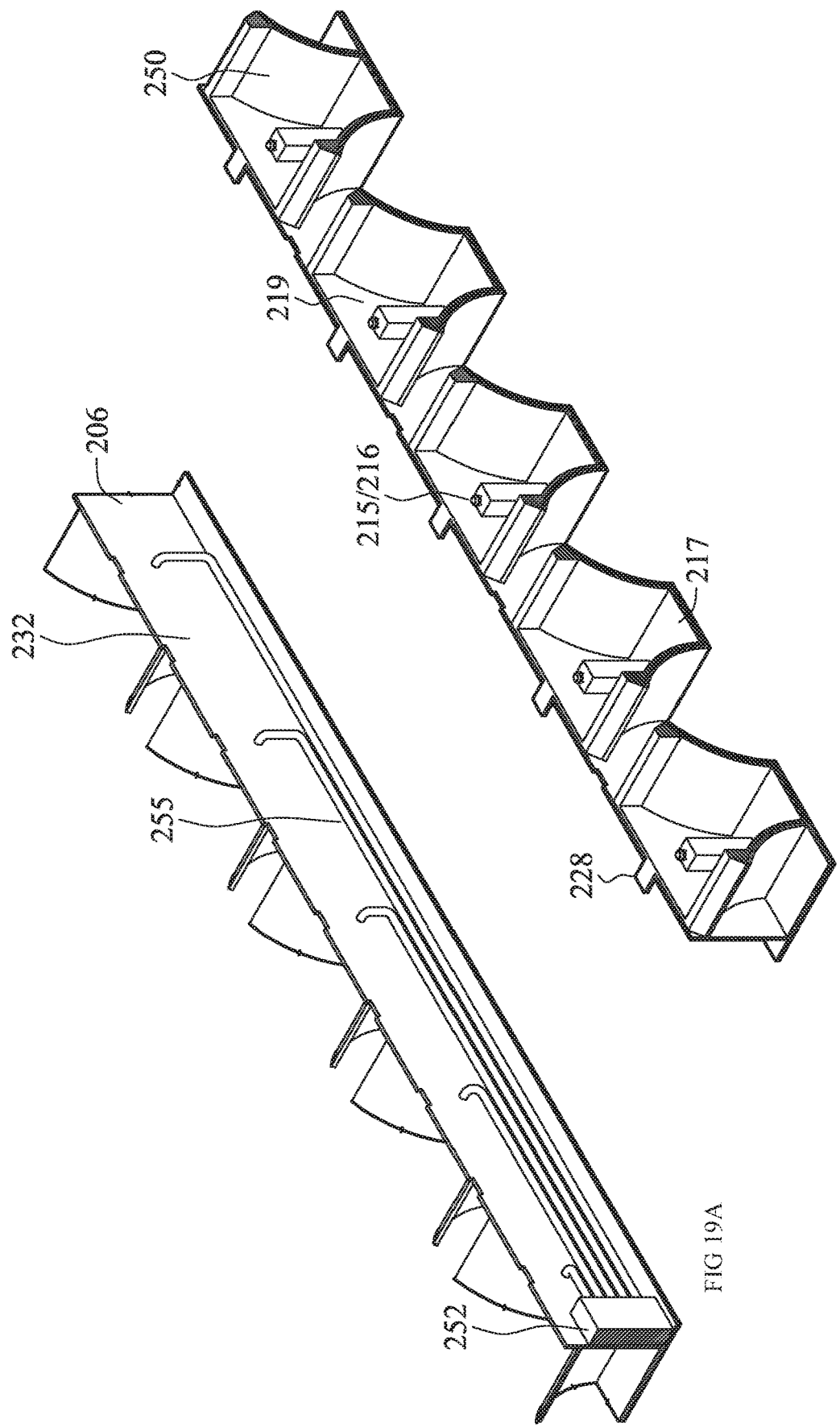

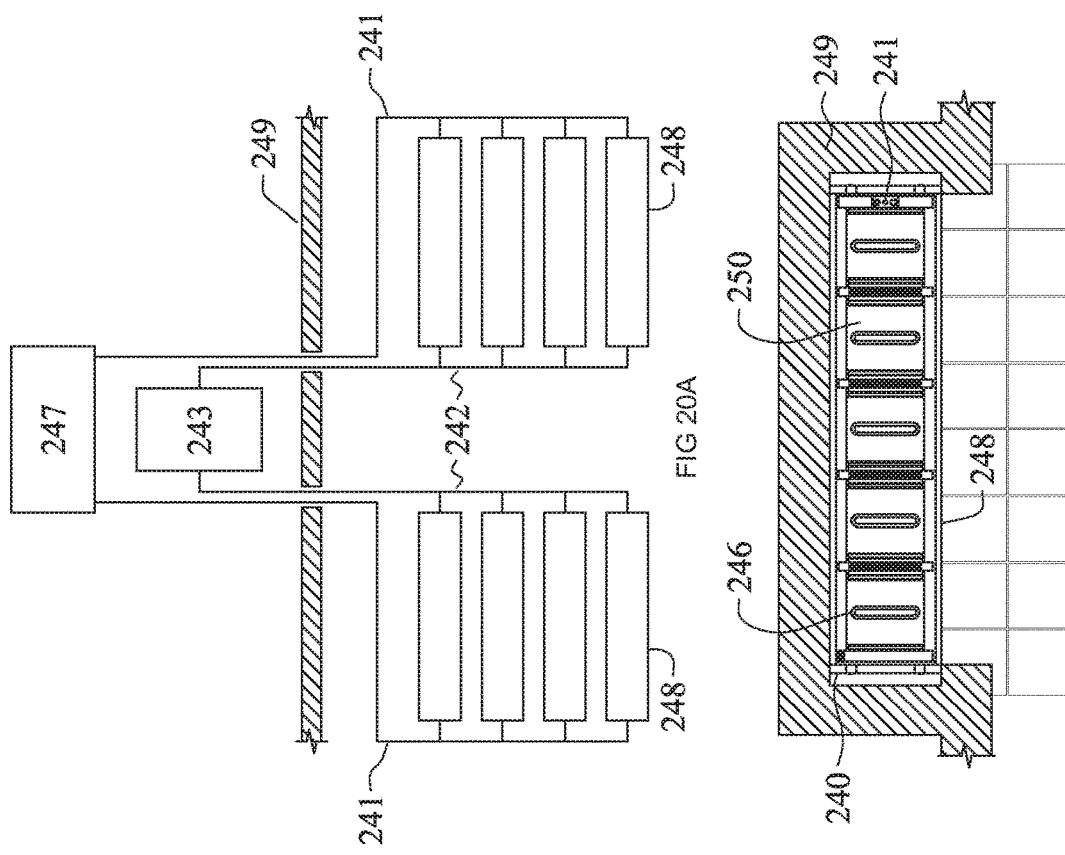
FIG 20A
FIG 20C
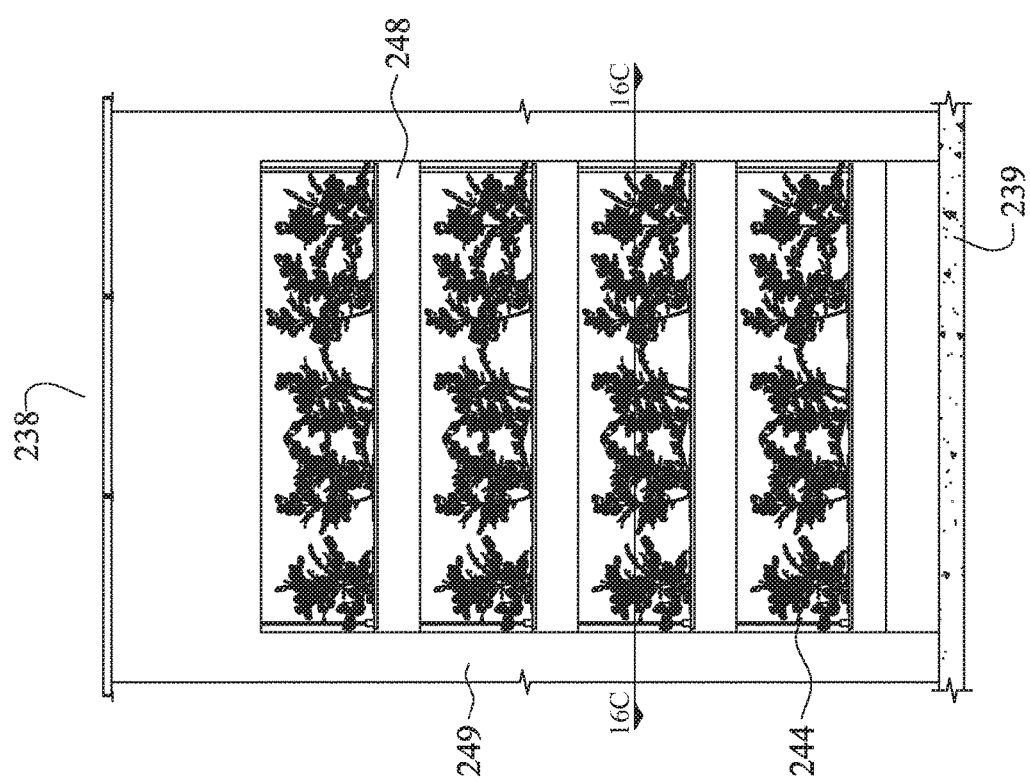
FIG 20B

US 11,129,339 B2

AUTOMATED VERTICAL PLANT CULTIVATION SYSTEM

CROSS REFERENCE TO RELATED APPLICATION[S]

This application is a continuation-in-part of the earlier U.S. Utility patent entitled "AUTOMATED VERTICAL PLANT CULTIVATION SYSTEM," Ser. No. 15/885,157, filed Jan. 31, 2018, which is a continuation-in-part of the earlier U.S. Utility patent entitled "AUTOMATED VERTICAL PLANT CULTIVATION SYSTEM," Ser. No. 15/589,845, filed May 8, 2017, and this application also claims priority to U.S. Provisional Patent Application Ser. No. 62/592,246, filed Nov. 29, 2017, the disclosures of which are hereby incorporated entirely herein by reference.

BACKGROUND OF THE INVENTION

Technical Field

This invention relates generally to a plant cultivation system and more particularly an automated plant cultivation system having multi-tiered vertically arranged horizontal structures each employing seed or plant capsules with a fluid circulation and illumination and communication network controlled by an on-board processor.

State of the Art

In urban environments, smart space utilization is key to reducing home and office costs. The 21st century electronic technologies have had a profound impact on design concepts applied to furniture/appliance placement in interiors. Present day interior electronic devices are slimline, compact, multifunctional and network designed to optimize floor and wall space. Device connectivity via the internet results in less dependency on printed material, further clearing floor and wall space previously taken up by bookcases.

As technological advances have changed design practices, indoor appliances and furniture, they have also isolated us from nature. While outdoor garden and parks are common in urban environments, a feature appreciated by all, indoor space for gardens in urban settings has thus far been the privilege of only the wealthy. The advent of the internet of things ("IoT") governed by resident intelligence now makes indoor horticulture affordable to all. Historic technological obstacles which stood in the way of home and office plant cultivation, including soil, moisture, lighting, insects, fungi, molds, algae, and odor control, have been overcome. Now, technology has made indoor plant cultivation not only possible, but also affordable for most people.

DISCLOSURE OF THE INVENTION

The present invention relates to an automated plant cultivation system having multi-tiered vertically arranged horizontal structures each employing seed or plant capsules with a fluid circulation and illumination and communication network controlled by an on-board processor.

An embodiment includes an automated vertical plant cultivation system comprising: a magazine structure for plant cultivation comprising: at least one fluid channel; a light source with a reflector aperture substantially concealing the light source from direct view; and at least two seed/plant reservoirs, each seed/plant reservoir retaining a seed/plant capsule, wherein the fluid channel extends across the light source aperture and each seed/plant reservoir allowing fluid into said reservoirs.

Another embodiment includes an automated vertical plant cultivation system comprising a magazine structure having: seed/plant capsules within seed/plant reservoirs alternately arranged between at least one of a light source substantially concealed from direct viewing; a fluid channel extend across a long axis of the magazine structure, wherein the magazine structure is adapted for use of seed/plant capsules with nutrient composite plant growth cultivation, hydroponic plant growth cultivation, aeroponic plant growth cultivation methods or combinations thereof.

Further, another embodiment includes an automated vertical plant cultivation system comprising: a magazine structure comprising: at least one seed/plant capsule fluid reservoir; a fluid channel; and a light source, wherein the seed/plant reservoir has an inner wall for containing fluid and an outer wall that is a light reflector.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4A is a top view of a fluid channel cover of a magazine structure of an automated vertical plant cultivation system, in accordance with embodiments;

FIG. 4B is a first side view of a fluid channel cover of a magazine structure of an automated vertical plant cultivation system, in accordance with embodiments;

FIG. 4C is a second side view of a fluid channel cover of a magazine structure of an automated vertical plant cultivation system, in accordance with embodiments;

FIG. 4D is a bottom view of a fluid channel cover of a magazine structure of an automated vertical plant cultivation system, in accordance with embodiments;

FIG. 4E is a top view of a first end fluid channel cover of a magazine structure of an automated vertical plant cultivation system, in accordance with embodiments;

FIG. 4F is a first side view of a first end fluid channel cover of a magazine structure of an automated vertical plant cultivation system, in accordance with embodiments;

FIG. 4G is a second side view of a first end fluid channel cover of a magazine structure of an automated vertical plant cultivation system, in accordance with embodiments;

FIG. 4H is a bottom view of a first end fluid channel cover of a magazine structure of an automated vertical plant cultivation system, in accordance with embodiments;

FIG. 4I is a top view of a second end fluid channel cover of a magazine structure of an automated vertical plant cultivation system, in accordance with embodiments;

FIG. 4J is a first side view of a second end fluid channel cover of a magazine structure of an automated vertical plant cultivation system, in accordance with embodiments;

FIG. 4K is a second side view of a second end fluid channel cover of a magazine structure of an automated vertical plant cultivation system, in accordance with embodiments;

FIG. 4L is a bottom view of a second end fluid channel cover of a magazine structure of an automated vertical plant cultivation system, in accordance with embodiments;

FIG. 5A is a section view of a magazine structure of an automated vertical plant cultivation system, in accordance with embodiments;

FIG. 5B is a section view of a magazine structure of an automated vertical plant cultivation system with plant/seed capsule, in accordance with embodiments;

FIG. 5I is a top view of another magazine structure of an automated vertical plant cultivation system, in accordance with embodiments;

FIG. 5J is a section view of the magazine structure of FIG. 5I taken along line 5J-5J, in accordance with embodiments;

FIG. 5K is a section view of the magazine structure of FIG. 5I taken along line 5K-5K, in accordance with embodiments;

FIG. 5L is a section view of the magazine structure of FIG. 5I taken along line 5L-5L, in accordance with embodiments;

FIG. 5M is a section view of the magazine structure of FIG. 5I taken along line 5M-5M, in accordance with embodiments;

FIG. 6A is a side view of a seed/plant capsule for use in an automated vertical plant cultivation system, in accordance with embodiments;

FIG. 6B is a section side view of a seed/plant capsule for use in an automated vertical plant cultivation system, in accordance with embodiments;

FIG. 6C is a section side view of a portion of a seed/plant capsule for use in an automated vertical plant cultivation system, in accordance with embodiments;

FIG. 6D is a side view of a seed/plant capsule for use in an automated vertical plant cultivation system, in accordance with embodiments;

FIG. 6E is a top view of a seed/plant capsule for use in an automated vertical plant cultivation system, in accordance with embodiments;

FIG. 7A is a section view of a lighting device of an automated vertical plant cultivation system, in accordance with embodiments;

FIG. 7B is a side view of a lighting device of an automated vertical plant cultivation system, in accordance with embodiments;

FIG. 7C is a section view of another lighting device of an automated vertical plant cultivation system, in accordance with embodiments;

FIG. 7D is a side view of a lighting device of an automated vertical plant cultivation system, in accordance with embodiments;

FIG. 8A is a perspective view of a magazine structure of an automated vertical plant cultivation system, in accordance with embodiments;

FIG. 8B is a perspective view of a magazine structure of an automated vertical plant cultivation system, in accordance with embodiments;

FIG. 8C is a perspective view of a magazine structure of an automated vertical plant cultivation system, in accordance with embodiments;

FIG. 8D is a perspective view of a magazine structure of an automated vertical plant cultivation system, in accordance with embodiments;

FIG. 11A is a perspective view of a magazine structure of an automated vertical plant cultivation system, in accordance with embodiments;

FIG. 11B is a perspective view of a magazine structure of an automated vertical plant cultivation system, in accordance with embodiments;

FIG. 11C is a perspective view of a magazine structure of an automated vertical plant cultivation system, in accordance with embodiments;

FIG. 11D is a perspective view of a magazine structure of an automated vertical plant cultivation system, in accordance with embodiments;

FIG. 12A is a top view of a seed/plant capsule for use in an automated vertical plant cultivation system, in accordance with embodiments;

FIG. 12B is a bottom view of a seed/plant capsule for use in an automated vertical plant cultivation system, in accordance with embodiments;

FIG. 12C is a first end view of a portion of a seed/plant capsule for use in an automated vertical plant cultivation system, in accordance with embodiments;

FIG. 12D is a second end view of a seed/plant capsule for use in an automated vertical plant cultivation system, in accordance with embodiments;

FIG. 12E is a side view of a seed/plant capsule for use in an automated vertical plant cultivation system, in accordance with embodiments;

FIG. 13A is a partial perspective exploded view of a fluid inlet of a seed/plant capsule reservoir, in accordance with embodiments;

FIG. 13B is a partial perspective view of a fluid inlet of a seed/plant capsule, in accordance with embodiments;

FIG. 15A is a partial longitudinal section of the seed/plant capsule inside the magazine, in accordance with embodiments;

FIG. 15B is another partial longitudinal section of the seed/plant capsule inside the magazine, in accordance with embodiments;

FIG. 15C is yet another partial longitudinal section of the seed/plant capsule inside the magazine, in accordance with embodiments;

FIG. 17A is a partial longitudinal section of the seed/plant capsule inside the magazine at the fluid supply inlet, in accordance with embodiments;

FIG. 17B is a partial longitudinal section of the seed/plant capsule inside the magazine at the fluid evacuation side of the magazine, in accordance with embodiments;

FIG. 17C is a partial longitudinal section of the seed/plant capsule inside the magazine at the fluid evacuation side of the magazine, in accordance with embodiments;

FIG. 18A is a partial longitudinal section of the seed/plant capsule inside the magazine at the fluid supply inlet, in accordance with embodiments;

FIG. 18B is a partial longitudinal section of the seed/plant capsule inside the magazine at the fluid evacuation side of the magazine, in accordance with embodiments;

FIG. 18C is a partial longitudinal section of the seed/plant capsule inside the magazine at the fluid evacuation side of the magazine, in accordance with embodiments;

FIG. 19A is a partial longitudinal section inside the magazine's supply channel looking toward the seed/plant capsule's reservoir, in accordance with embodiments;

FIG. 19B is a partial longitudinal section inside the magazine with seed/plant capsules looking toward the magazine's fluid supply channel, in accordance with embodiments;

FIG. 20A is a block diagram of a plurality of magazine banks separated by a wall from fluid circulatory and power/control devices, in accordance with embodiments;

FIG. 20B is an interior space section with recessed magazines inside a wall niche, in accordance with embodiments; and FIG. 20C is a horizontal section inside a wall niche containing magazine(s), in accordance with embodiments.

DETAILED DESCRIPTION OF EMBODIMENTS OF THE INVENTION

Figure 1A:
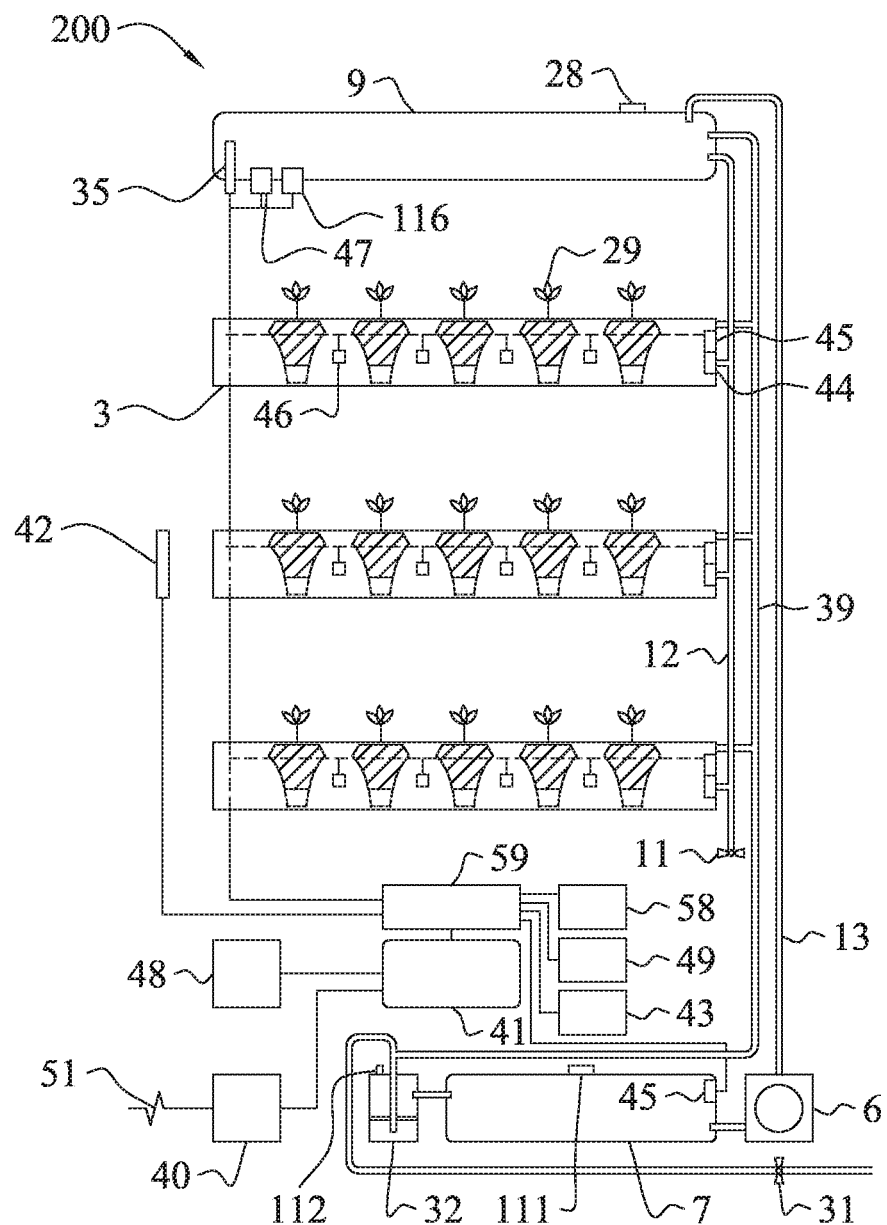
FIG. 1A is a schematic view of an automated vertical plant cultivation system, in accordance with embodiments.
Figure 1D:
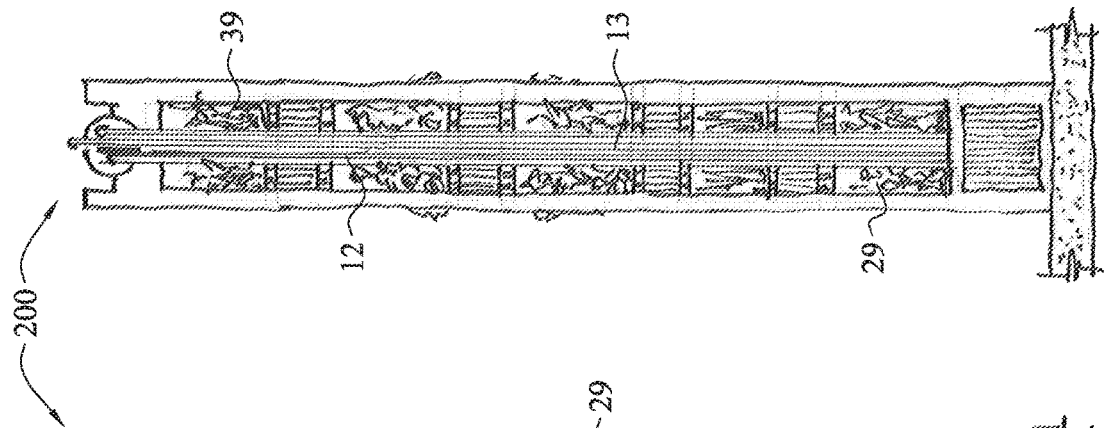
FIG. 1D is a side view of an automated vertical plant cultivation system, in accordance with embodiments.
Figure 1C:
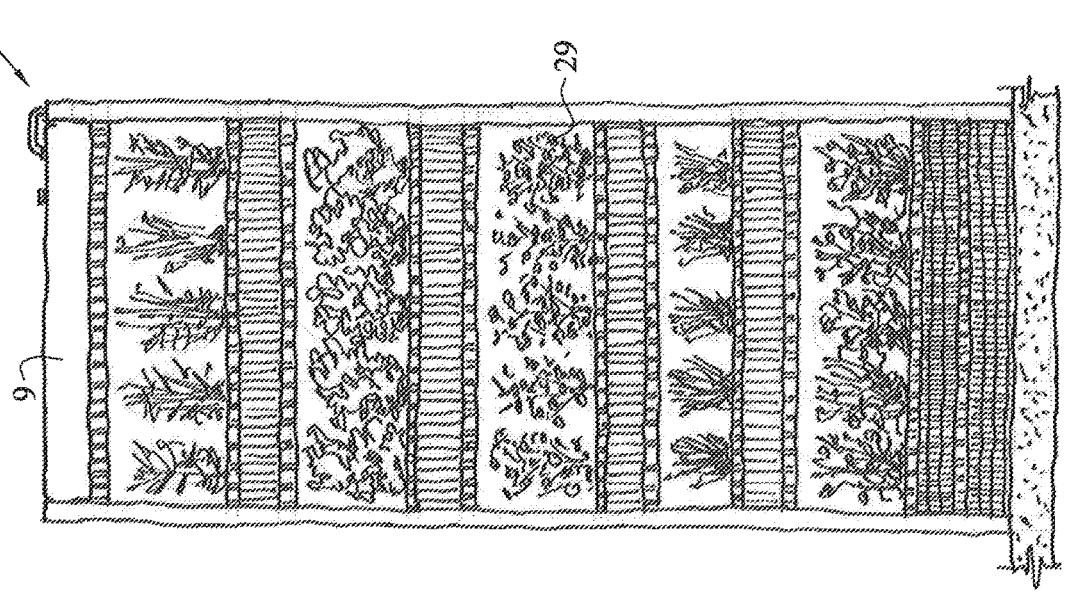
FIG. 1C is a front view of an automated vertical plant cultivation system, in accordance with embodiments.
Figure 1B:
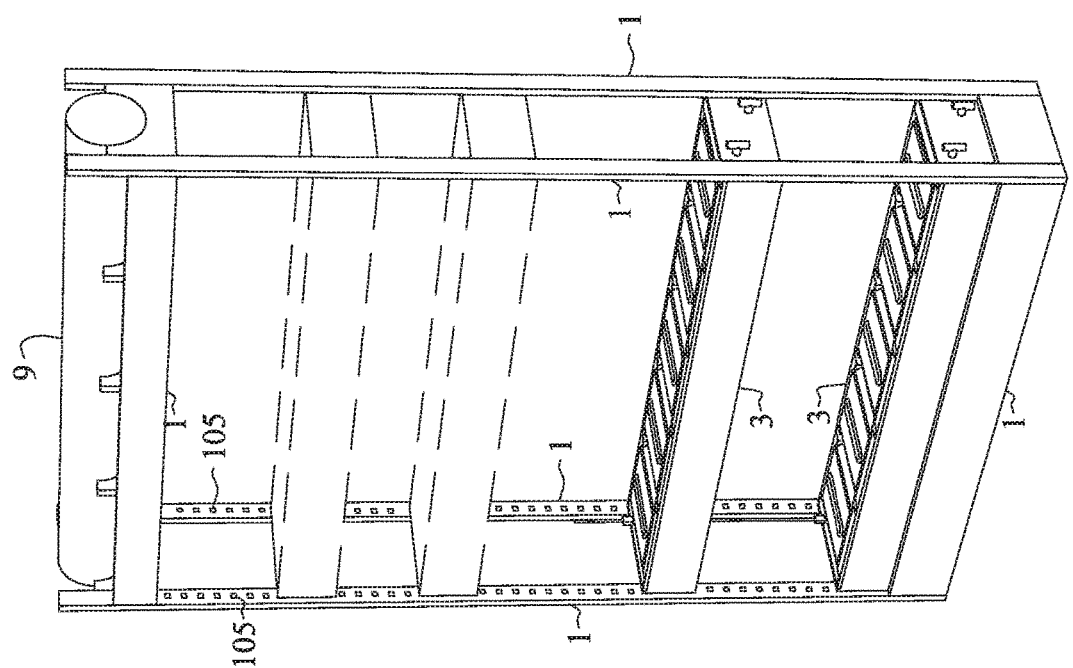
FIG. 1B is a perspective view of an automated vertical plant cultivation system, in accordance with embodiments.

As discussed above, embodiments of the present invention relate to an automated plant cultivation system having multi-tiered vertically arranged horizontal structures each employing seed or plant capsules with a fluid circulation and illumination and communication network controlled by an on-board processor.

The Innovation(s)

Successful plant cultivation is dependent on growing the plant in a suitable environment. Indoor cultivation is incompatible with most plant-growing environments. The advent of IOT technology, supported by a programmed processor that emulates the plant's natural environment, enables indoor plant cultivation today. Plants have diverse environmental growth needs. Present state of the art cultivators does not discern between different plants within a single cultivator providing all plants equal fluid supply and illumination levels, duration and spectral distribution.

The present innovation overcomes these limitations by segregating plant material inside individual capsules whereas the capsules are nestled inside a magazine seed or plant reservoir creating micro-environments for each capsule plant material. Each capsule may be keyed mechanically and/or electronically allowing only authorized OEM devices to be used. The capsule is detachable delivered with an imbedded electronic storage device containing data including the capsule's unique ID, its plant material, plant growing instructions, manufacturing date and expiration date. Once a capsule is placed inside the seed or plant capsule reservoir, it becomes electrically engaged. Data stored in the capsule's memory device is transmitted to the cultivator's processor. The processor then authenticates the capsule and if the capsule is authenticated as an OEM component, the capsule joins the cultivator's device network. The processor is aware of each capsule's ID, its location within the magazine's seed or plant capsule reservoir and the entire magazine assembly within a cultivation networked assembly. Operationally, a user can interact and control the growth of the capsules' plants via a cultivator console and/or remote wired or wireless communication device/s. The seed or plant capsule may include anti-tampering means. These means may include capsule's disengagement from network and controlling the duration of the capsule's authentication. The capsule may have an indicator affixed to one of its external surfaces indicating if the capsule's content is fit for use. The indicator may sense moisture condition inside the capsule and/or the extreme temperature/s the capsule experienced to date. The capsule design may offer cultivation method variability, eliminating the need for customized capsule design for each cultivation method.

Embodiments of this innovation may employ inside the capsule and above the plant root structure fluid inlet ports. Such inlet location protects the fluid opening/s being plugged by roots. Moisture sensor probes also inside the capsule/s can provide input to the processor about fluid levels in real time. At the wall of the capsule interior, the floor may be sloped toward the drain port to evacuate the capsule's fluid. Both the inlet channel and the evacuation channel may retain multi-port valves. Fluid entering the magazine at the supply channel can supply fluid to individual seed or plant capsules where and when needed. Similarly, fluid inside the capsules can be individually evacuated through the evacuation channel when and where needed. The multi-port valve may also have an integral pump. Such assembly may be employed in the absence of a gravity tank.

The present innovation enables the processor to provide for an optimal growing environment to the magazine's capsules' diverse plant species as taught in the parent application Ser. No. 15/589,845 or in a split cultivation assembly having remote components taught herein. The latter embodiment separates the magazines with their seed or plant capsules from elements of the power, data and fluid circulatory systems. These elements can include fluid tank/s, pump, piping, filtration equipment, processor, transceiver, sensing devices, power management, memory devices and back-up power. When employing a local/remote cultivation assembly, the remote component of the assembly can support several cultivator assemblies with the same "back of the house" elements. The present innovation also describes a seed or plant capsule suitable for use for hydroponic, aeroponic and soil/compost plant irrigation methods.

Automated Vertical Plant Cultivation System

An Automated Vertical Plant Cultivation System (200) automates indoor plant cultivation by simplifying a process otherwise requiring constant attention. The innovative design concept resolves the challenge of introducing plant material into an indoor space in an attractive manner occupying minimum space.

FIG. 1A shows the assembly's design concept and structural frame. The concept's key element is its magazine. Prior to teaching about the magazine, an overview of the system's fluid circulatory, power and controls systems will help to understand the magazine's multilayered innovation.

Fluid Circulation System

Figure 3B:
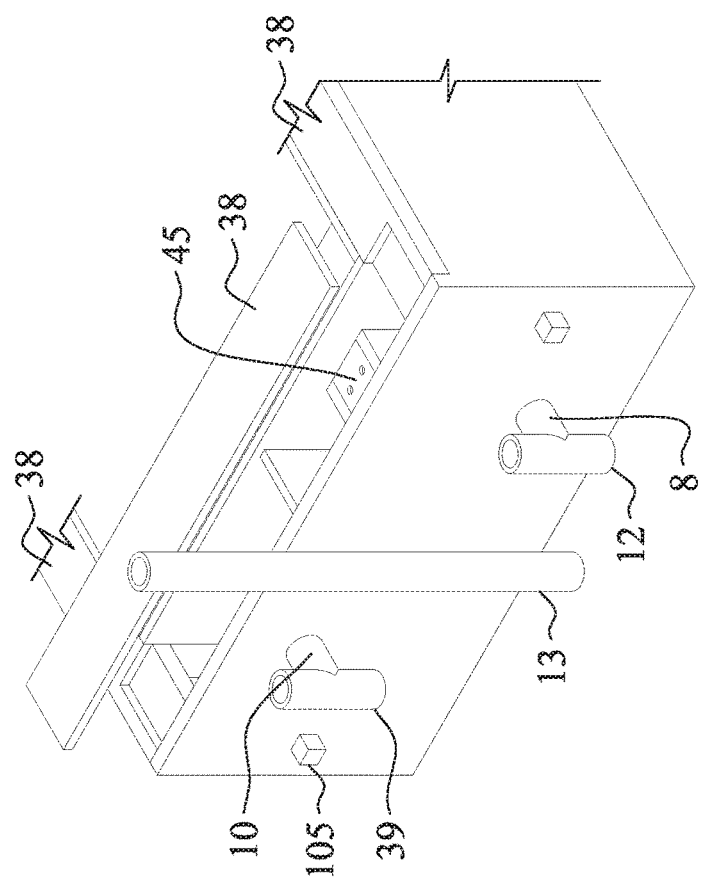
FIG. 3B is a partial perspective, partially exploded view of the fluid entry portion of a magazine structure of an automated vertical plant cultivation system, in accordance with embodiments.

FIG. 1A-1D depicts the system's fluid circulation system for seed/plant capsule (4) containing nutrient composite (16) supported by electronic devices. An inlet shut-off valve (31) passes fluid (5) to a holding/overflow tank (7) through an optional filter cup (32). An electric pump (6) lifts the fluid (5) to a gravity tank (9) elevated above magazines (3). At the gravity tank (9), the fluid (5) may be oxygenated. Also, if needed, the fluid (5) temperature may be regulated. A fluid sensor (45) in the gravity tank (9) monitors the tank's fluid level. At least one pipe (12) connects the gravity tank (9) to the plant magazine (3). Also, at least one overflow pipe (39) connects the gravity tank (9) to an overflow outlet (33) in magazine/s, an optional filter cup (32) and the overflow/holding tank (7). When fluid levels at the gravity tanks (5) exceed a set level, fluid flows through the gravity tank overflow bypass (23) directly into an optional detachable filter cup (32) and from there to the holding/overflow tank (7). The filter cup (32) collects particles in the fluid (5) and is cleaned periodically. Fluid (5) flows to each magazine (3) by gravity. At each magazine inlet (25), a valve (44) controls the volume of fluid (5) permitted to enter the magazine (3). As is with the gravity tank (9), if fluid levels exceed a set level inside the magazine (3) an overflow bypass outlet (33) releases excess fluid through the overflow pipe (39) back to the optional filter cup (32) or directly to the holding/overflow tank (7). The magazine valve (44) operation can be controlled by a moisture/fluid sensor (45) as shown in FIGS. 1A & 3B or by the assembly controls (41) responding to a signal from the moisture/fluid sensor (45). In both methods fluid level inside the magazine (3) is monitored. When fluid levels fall below a set level, the sensor (45) directly or indirectly via the assembly controls (41) opens the valve to allow fluid to reach a pre-set level. When fluid level exceeds set point level but does not reach the overflow outlet (10), it is left to be consumed by plant (29) and evaporation. When fluid (5) levels in the gravity tank (9) drop below a pre-set level, the tank's fluid sensor (35) directly or indirectly via the assembly controller opens the inlet shut-off valve (31) to allow fluid (5) to enter the holding/overflow tank (7) while activating the pump (6) forcing water into the gravity tank (9). In a different embodiment, the fluid circulation system doesn't employ a gravity tank (9) delivering fluid directly to magazine (3). Also, in a different embodiment where direct connectivity to exterior fluid outlet is not available, fluid can be poured directly or indirectly to the holding tank through an inlet.

The system's versatile fluid circulation system supported by electronic devices is capable of cultivating plants by conventional seed embedded in nutrient rich composite, hydroponic or aeroponic methods. FIGS. 1A-1D depicts the system's assembly fluid circulation system for both seed/plant capsule employing nutrient composite (FIGS. 6A-6E); a hydroponic capsule having the nutrient mixed in the fluid (FIGS. 6F-6J), and a aeroponic capsule having the nutrient mixed in the fluid (FIGS. 6K-6O). FIGS. 6F-6J depict the hydroponic seed/plant capsule in elevations and section form. The hydroponic fluid solution is poured through an inlet opening (110) above the holding/overflow tank (7) or through an inlet opening at the filter cup inlet (112).

The system is typically connected directly to the fluid access point. Where such point is not available, fluid is poured into the system assembly overflow/holding tank.

Power and Controls System

The system's fluid (5) circulation, lighting (46), sound (49), and communication (43) devices are electrically powered and governed in part or in whole by the assembly's control (41). Most or all devices' voltage is stepped down (40).

The assembly control responsibilities include but are not limited to:
A. Managing a synchronized operation of devices.
B. Monitoring devices and creating data sets if required.
C. Alerting user when an assembly device experiences an anomaly.
D. Facilitating backup power connectivity when experiencing a power shortage.
E. Providing diagnostic and troubleshooting reports.
F. Monitoring ambient conditions including assembly fluid temperature.

Tasked with maintaining favorable environmental conditions for plant growth, the assembly's controls (41) consist of a processor with memory that governs in part or in whole a device network consisting of communication module (43), communicating with local or local and remote devices, power distribution bus (59), a thermal probe/heater (116) lighting devices (46), a pump (6), an oxygenator (47), valves (11), a photo sensor (58), a moisture/fluid level sensor (45), an optional back-up power module (48) and/or an audio module (49) and a local or remote I/O communication module (43). Input/output to and from the system's assembly control is via a local interface directly mounted to the control panel, on an easy to reach panel at the assembly walls (42) or by remote device. Alternatively, a wireless remote device may also be used or be substituted for the control interface.

The fluid circulation system may employ two types of sensors—a basic type sensing moisture upon contact or a sensor programmed with a fluid level range variability. The system includes valves that may be bi-directional, allowing fluid to enter at one inlet and draining fluid in a neighboring outlet. The fluid/moisture sensor (45) of the system assembly must be perfectly plumb for proper operation and not subjected to vibrations and/or fluid agitation.

Upon activation, the system assembly controls (41) query the operational status of its network devices. Once all devices are confirmed to be online and ready to be used, the fluid's circulation process begins with the fluid sensor/s (45). The sensor/s send input to the controls about fluid levels in some or all the fluid containing vessels. The controls (41) then activate the fluid circulation system.

As the circulation system comes online, the overflow/holding tank fluid level reaches a point triggering the pump (6) to lift the fluid (5) to the gravity tank (9). A sensor in the gravity tank is in communication with the pump (6) allowing fluid volume to rise to a pre-set level. As the fluid at the gravity tank reaches a pre-set point, the magazines' valves (44) open to let fluid in. Fluid flow into the magazine stops by input from the moisture/fluid sensor (45) once the fluid level reaches a pre-set point. The flow of fluid to the magazine/s may be preceded by an oxygenator (47) at the gravity tank (9) enriching the oxygen content in the fluid (5) and/or a thermal probe/heater (116) regulating the fluid (5) temperature.

Figure 3A:
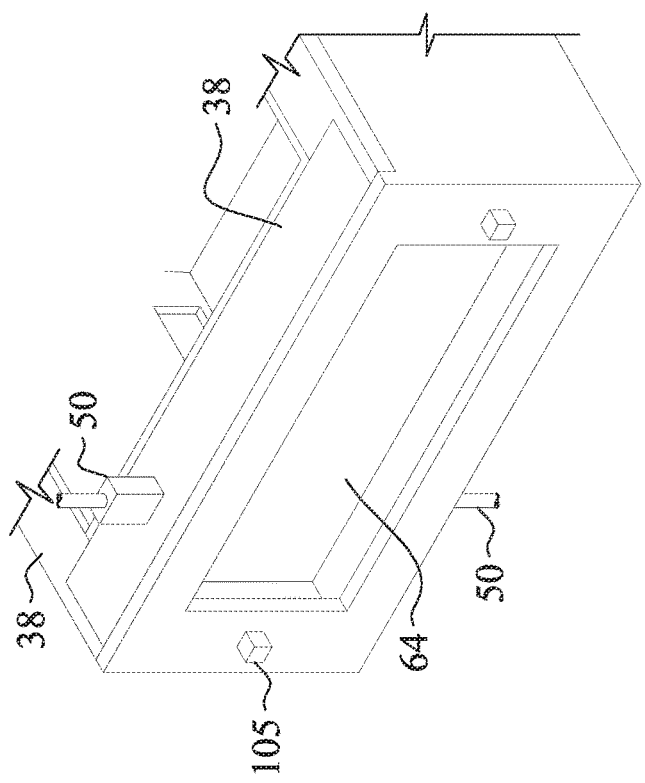
FIG. 3A is a partial perspective view of the power entry portion of a magazine structure of an automated vertical plant cultivation system, in accordance with embodiments.
Figure 5C:
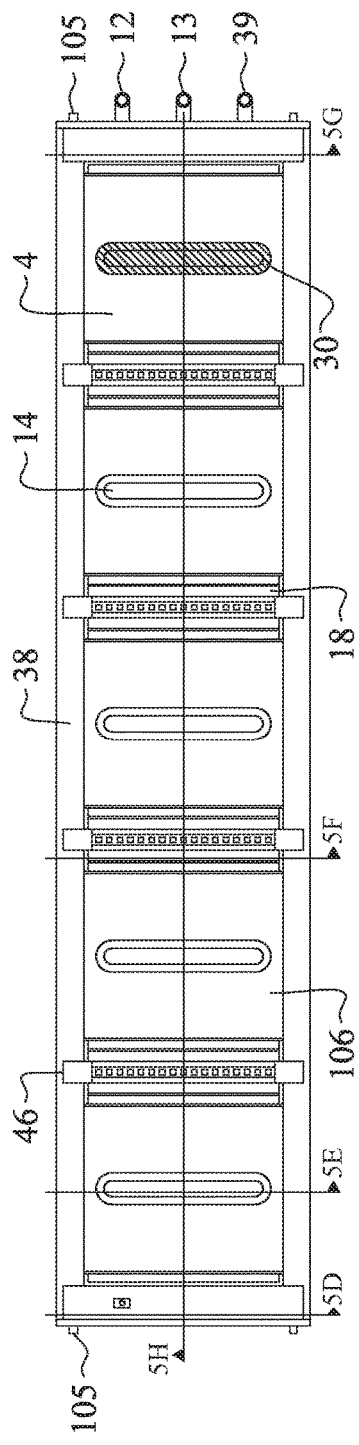
FIG. 5C is a top view of a magazine structure of an automated vertical plant cultivation system, in accordance with embodiments.
Figure 5E:
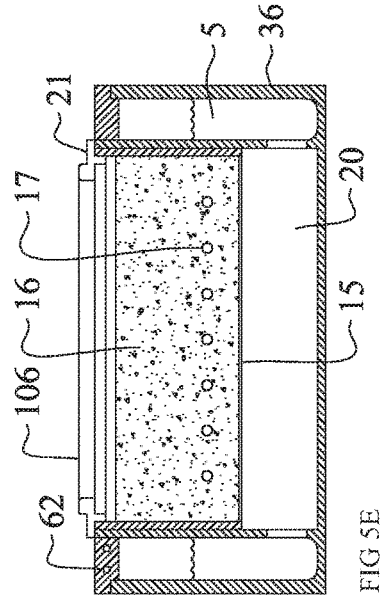
FIG. 5E is a section view of the magazine structure of FIG. 5C taken along line 5E-5E, in accordance with embodiments.
Figure 5G:
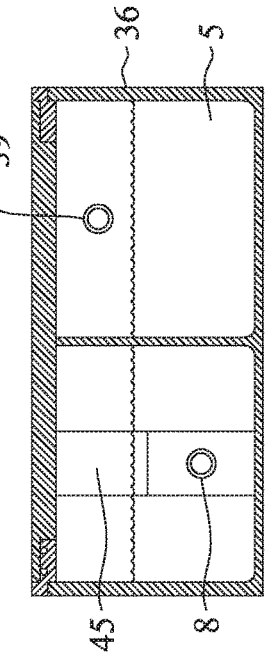
FIG. 5G is a section view of the magazine structure of FIG. 5C taken along line 5G-5G, in accordance with embodiments.
Figure 5D:
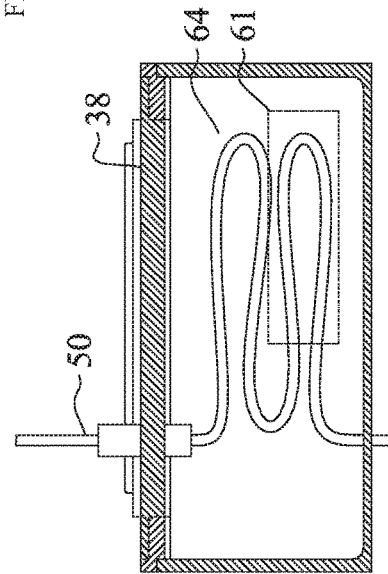
FIG. 5D is a section view of the magazine structure of FIG. 5C taken along line 5D-5D, in accordance with embodiments.
Figure 5F:
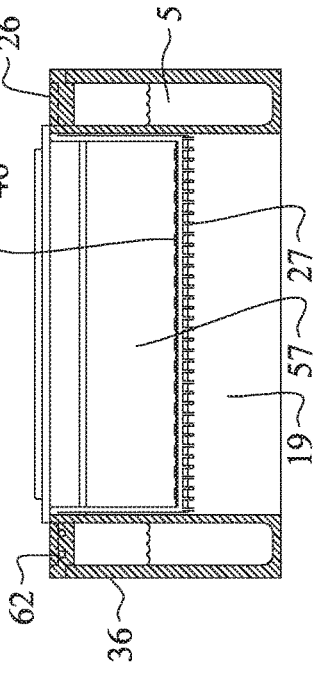
FIG. 5F is a section view of the magazine structure of FIG. 5C taken along line 5F-5F, in accordance with embodiments.

FIG. 3A shows partial elevations of the magazine's power connectivity and fluid external circulation system. FIG. 3B shows the fluid inlet (8), inside the magazine's inlet reservoir (37), an inlet valve (44) which permits fluid to enter the magazine and the moisture/fluid sensor (45) abutting the valve (44). Both operate in unison to control fluid level in the magazine. Any access fluid (5) drains down to the filter cup (32) or directly into the overflow tank (7) through the magazine's overflow outlet (33). In aeroponic embodiments bi-directional valves may be used to let fluid in the magazine and then drain it out to the overflow/holding tank in a cyclical manner.

FIG. 3A shows the opposite end of the magazine's fluid inlet. This end receives power or power/data from the power/data bus conveying it to devices inside/on the magazine and downstream devices. It has a small compartment to install a power supply/modulator if needed and conceal wiring slack. Inside/on the magazine the common devices may include valve/s, sensor/s, light module/s, temperature probe and photo sensor. The power or power/data is conveyed in the magazine through fluid channel covers. FIGS. 4A-4L shows the covers with their respective power or power/data receptacles. FIGS. 4E-4H show a plug & play receptacle in the cover top and bottom faces. The power or power and data enter from below and are conveyed to the next magazine or device/s from above. Inside the cover, the power or power/data are routed to connect with the long power cover shown in FIGS. 4A-4D, also showing the lighting device receptacles (53). The cover at the opposite end to the power entry conveys power to the moisture/fluid sensor, the valve/s and to an optional temperature probe. FIGS. 4I-4L show the cover with its power/data pronged connectors to moisture/fluid sensor (45) and valve/s (44) in the fluid inlet reservoir (37).

The lighting devices (46) operate by the controller's (41) programmed schedule or can operate manually. Power enters the reflector's aperture (56) from the fluid channel cover (38). The receptacles (53) for the lighting devices (46) are located on the fluid channel cover (38). FIGS. 7A-7D shows the lighting device (46) consisting of a "U" shaped element having lateral outwardly extensions (26) on the upright legs' top end. The extensions serve as hanging points for the lighting device (46) and power or power/data connectivity point at one side. Below, a light source (65) strip, typically LED cultured onto a substrate mounted onto a heatsink (27) having fins (63) to dissipate the heat generated by the light source (65). In some embodiments, the non-powered hanger can conduct the heat into the fluid channel (22) when needed.

The light source (65) spectral distribution via the assembly controls (41) can be modulated. Such modulation can provide pleasant illumination during periods where the space is occupied, or switching to grow light spectral distribution when the space is vacant of occupants or per schedule. The light output can also be modulated with programmed pre-set output modes. The lighting device (46) is detachable, shielded from direct contact by a reflector assembly and safe from electrical shock being powered by low voltage.

System Magazine

Figure 2A:
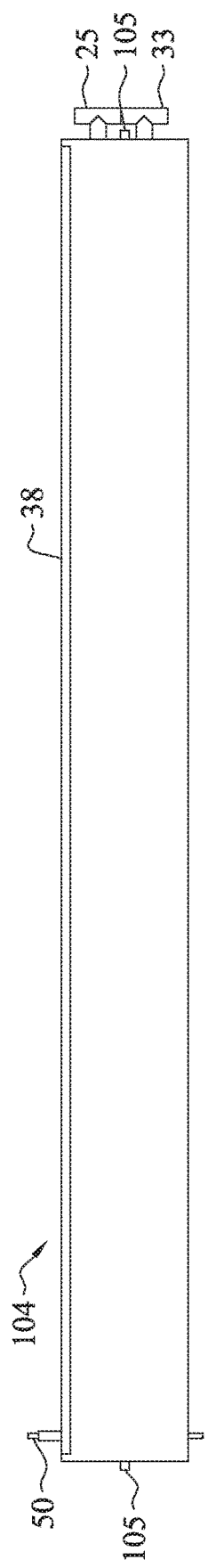
FIG. 2A is a side view of a magazine structure of an automated vertical plant cultivation system, in accordance with embodiments.
Figure 2B:
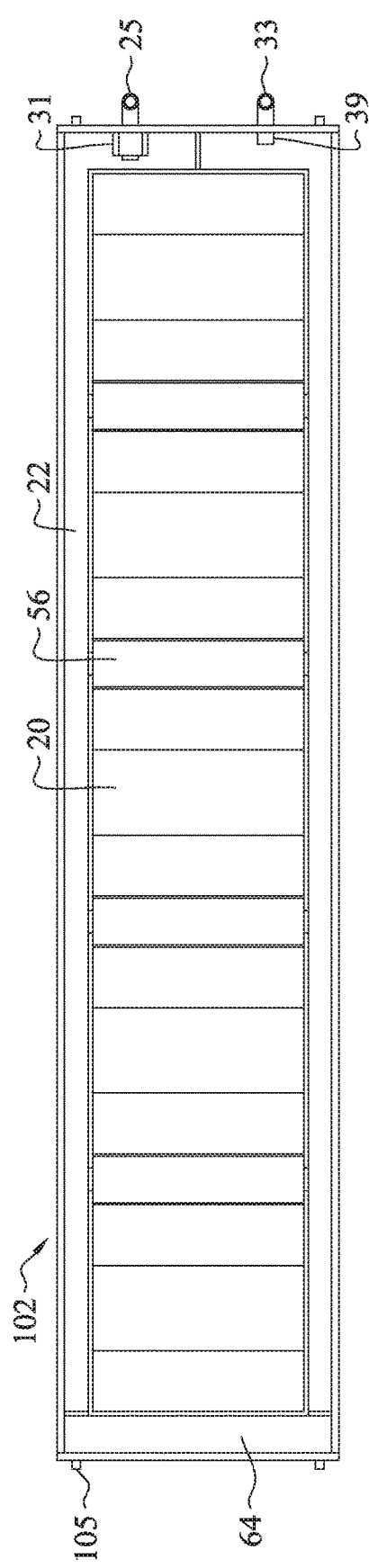
FIG. 2B is a top view of a magazine structure of an automated vertical plant cultivation system, in accordance with embodiments.
Figure 2C:
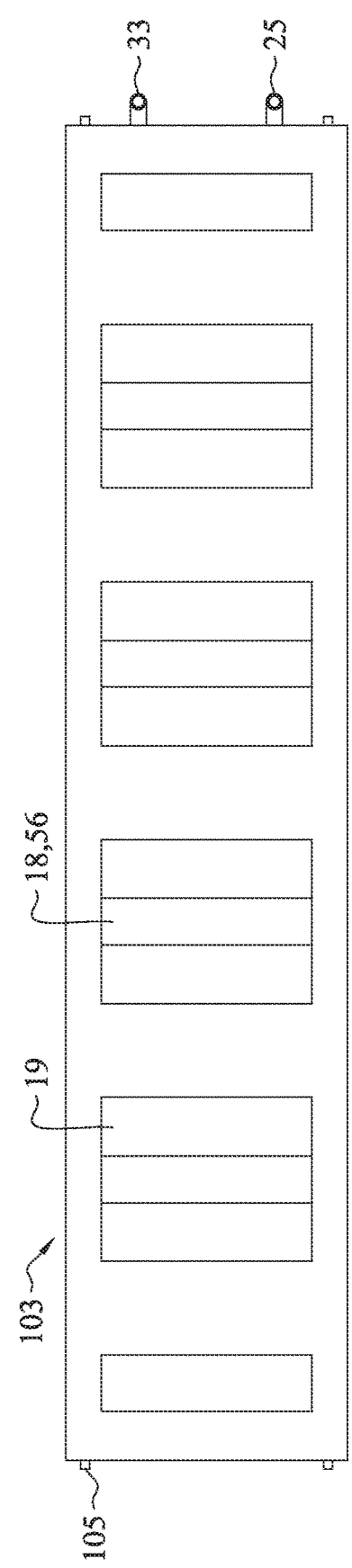
FIG. 2C is a bottom view of a magazine structure of an automated vertical plant cultivation system, in accordance with embodiments.

The magazine (3) is an embodiment providing structural support to plant material, acting as a fluid containing vessel, and providing illumination to plants, as depicted in FIGS. 2A-5M and 8A-11D. FIGS. 5A-5B shows the magazine in section, where section FIG. 5A shows the structure only and FIG. 5B shows the section structure with seed/plant capsules (4) and lighting devices (46). The magazine is commonly made of non-porous material sufficiently rigid to support its weight, seed/plant capsules (4), fluid (5), and lighting devices (46) over relatively long spans. Alternatively, the magazine may be made of non-porous materials with lining to contain fluid. The most common form of magazine (3) shown in FIGS. 2A-2C is rectangular. A rectangular magazine has at least one double wall (36) along its long axis to form the fluid channel (22) between walls. The fluid channel at the inner magazine wall (36) drain into multiple plant/seed capsule reservoirs (20). These reservoirs shown in FIGS. 5C and 5I and 8A-11D are alternately located between lighting reflector apertures (55) shown in FIGS. 7A-7D. At one of magazine's short ends FIG. 3B a micro valve (44) controls fluid (5) flow into the magazine (3). As fluid (5) enters the magazine (3), it flows into an inlet reservoir (37) and from there to the magazine fluid channel (22). The fluid (5) then flows to the magazine plant/seed capsule reservoir (20) maintaining an equal level at all reservoirs when magazines are horizontally plumb. A moisture/fluid sensor (45) directly or indirectly via the assembly controller (41) maintains a pre-set fluid level by controlling the micro valve (44) operation. The moisture/fluid sensor (45) can be integrated with the micro valve (44) as shown in FIG. 3B or remote at the opposite end of the magazine fluid inlet (25). The plant/seed capsules (4) inserted into the capsule reservoir (20) are immersed in the fluid (5). The fluid (5) level rises just above the seed's (17) vertical elevation placement. Aeroponic magazine embodiment shown in FIGS. 6K and 6L includes a piping network (113) with mounts (115) through the fluid channel/s leading to the plant/seed reservoir. There fluid atomizers (114) spray their mist onto the plant root. The aeroponic valve may serve as an inlet and drain valve in conjunction with the fluid pump excluding the use of the gravity tank.

The magazine's (3) fluid circulation system employs detachable fluid channel covers (38) to protect the circulation system from contamination, harboring insects and evaporation. When a seed capsule is not used, a cover (106) provides equal protection. A light aperture opening cover (117) is used where no light device is used or there is no need for up-lighting.

FIGS. 5A-5M and FIGS. 7A-7D and FIGS. 8A-11D show how the lighting devices are integrated into the magazine's architecture. The magazine's lighting devices (46) are located between the plant/seed capsule reservoirs (20). These devices (46) are substantially concealed from direct viewing by reflector apertures (55) which also acts as the exterior wall of the plant/seed capsule reservoir (21). The reflector's short ends are abutting the magazine's fluid channel (22) walls. Power flows to the lighting devices through conductors embedded in the fluid channel cover (38). The lighting device rests on the channel cover at both sides of the magazine and plug-in prongs at one side engage a corresponding receptacle on the top surface of the fluid channel cover.

FIGS. 7A-7D and 8A-11D shows the reflector aperture partly open at is apex. Hung from both ends, the lighting device light source (65) is optimally located inside the reflector (55) to cast illumination upwardly and downwardly. The opening at the reflector's (55) apex permits direct light to illuminate the bottom of the plant (29) canopy. The enclosed portion of the reflector (55) having reflective surface (57), captures low angles light rays and re-directs them downwardly to top of plant (29) canopy of the magazine (3) below. The reflector (55) surface can be made partially or fully of highly reflective material.

The reflector aperture (55) confines the distribution light beam pattern to substantially fall on plant (29) material and not stray beyond. This capability is important when light spectral distribution which is harmful to human exposure is used. The light source (65) spectral wavelength can be limited to "grow light" spectral distribution only, or can also include other spectral distributions. In such settings, the light emittance can be set on a scheduler governed by the system controller.

The reflector aperture opening (56) enables air to flow from the bottom to the top of the magazine (3), cooling the lighting device and eliminating heat stratification. In addition, the lighting device's (46) un-powered hanging leg can cool the device by conducting heat into the fluid channel (22).

In another embodiment, bi-directional illumination is provided by having two light sources aimed at substantially opposite directions. FIGS. 7A-7D shows two light sources mounted on the lighting device inside the reflector, where one is aimed upwardly and the other downwardly. The same lighting device may employ at least one light source. The system may also employ a lighting device in the vicinity of the gravity tank. This device's use may include illuminating the space where the light band spectrum emulates sunlight, and is used in dark environments where occupants may develop SAD (Seasonal Affective Disorder).

System Plant/Seed Capsule

Figure 6F:
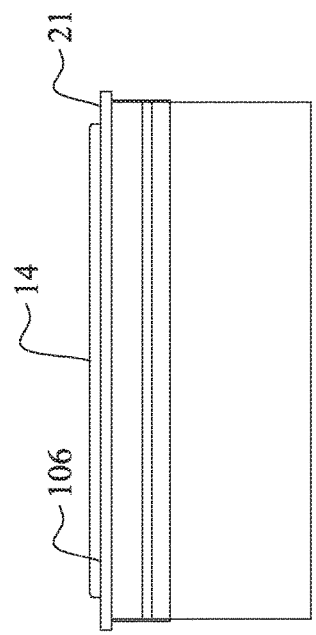
FIG. 6F is a side view of a hydroponics seed/plant capsule for use in an automated vertical plant cultivation system, in accordance with embodiments.
Figure 6I:
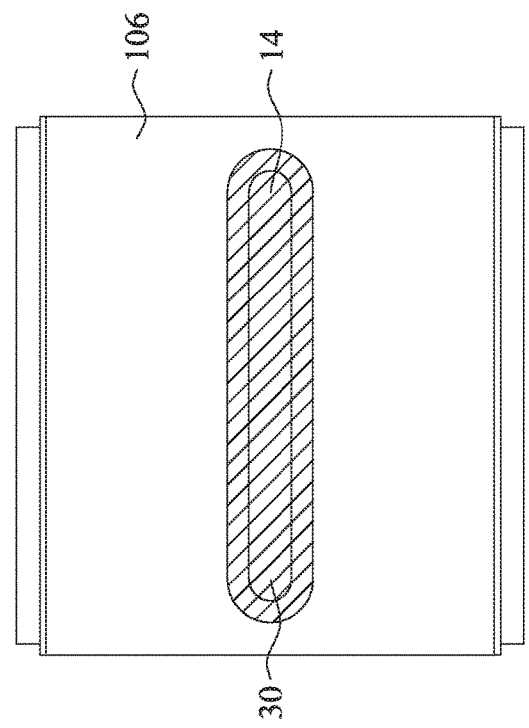
FIG. 6I is a side view of a hydroponics seed/plant capsule for use in an automated vertical plant cultivation system, in accordance with embodiments.
Figure 6G:
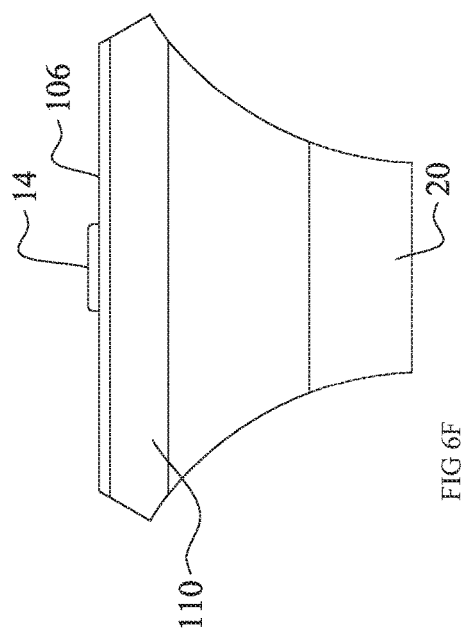
FIG. 6G is a section side view of a hydroponics seed/plant capsule for use in an automated vertical plant cultivation system, in accordance with embodiments.
Figure 6J:
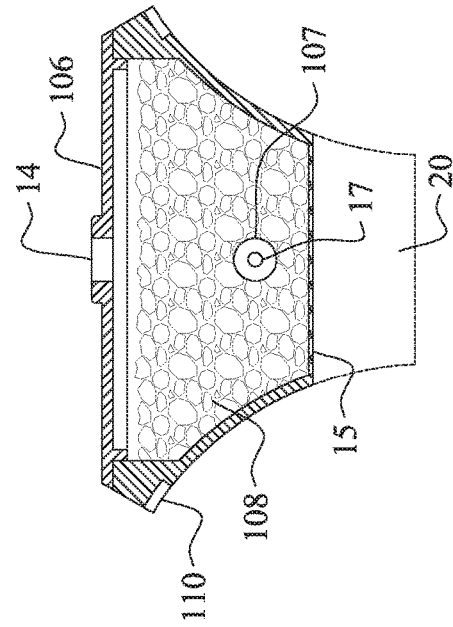
FIG. 6J is a top view of a hydroponics seed/plant capsule for use in an automated vertical plant cultivation system, in accordance with embodiments.
Figure 6H:
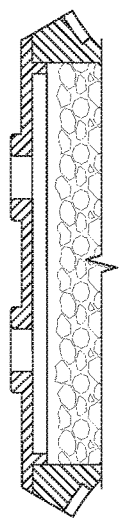
FIG. 6H is a section side view of a portion of a hydroponics seed/plant capsule for use in an automated vertical plant cultivation system, in accordance with embodiments.
Figure 6N:
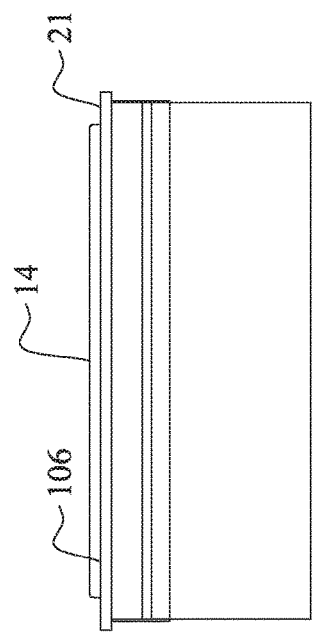
FIG. 6N is a side view of an aeroponics seed/plant capsule for use in an automated vertical plant cultivation system, in accordance with embodiments.
Figure 6O:
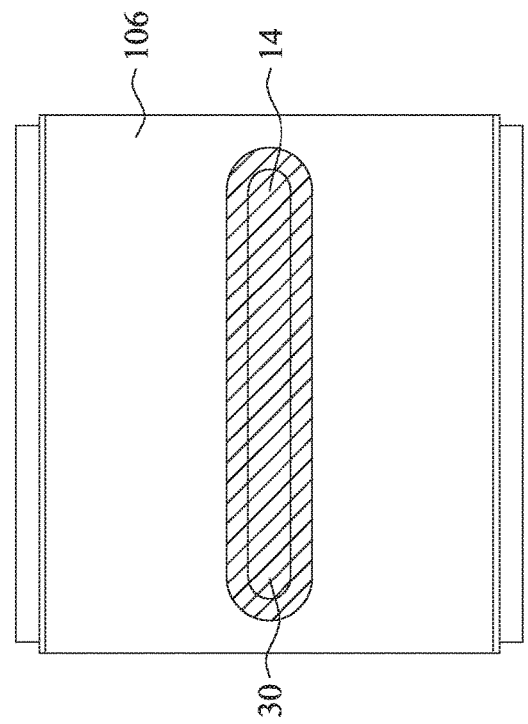
FIG. 6O is a top view of an aeroponics seed/plant capsule for use in an automated vertical plant cultivation system, in accordance with embodiments.
Figure 6K:
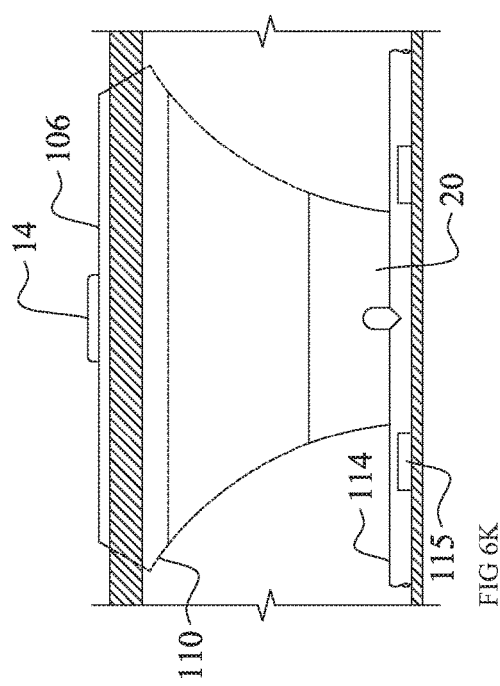
FIG. 6K is a side view of an aeroponics seed/plant capsule for use in an automated vertical plant cultivation system, in accordance with embodiments.
Figure 6L:
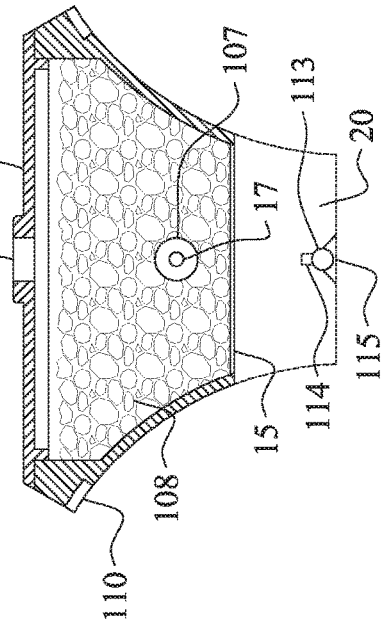
FIG. 6L is a section side view of an aeroponics seed/plant capsule for use in an automated vertical plant cultivation system, in accordance with embodiments.
Figure 6M:
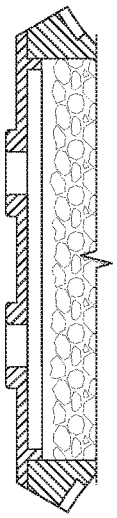
FIG. 6M is a section side view of a portion of an aeroponics seed/plant capsule for use in an automated vertical plant cultivation system, in accordance with embodiments.
Figure 9C:
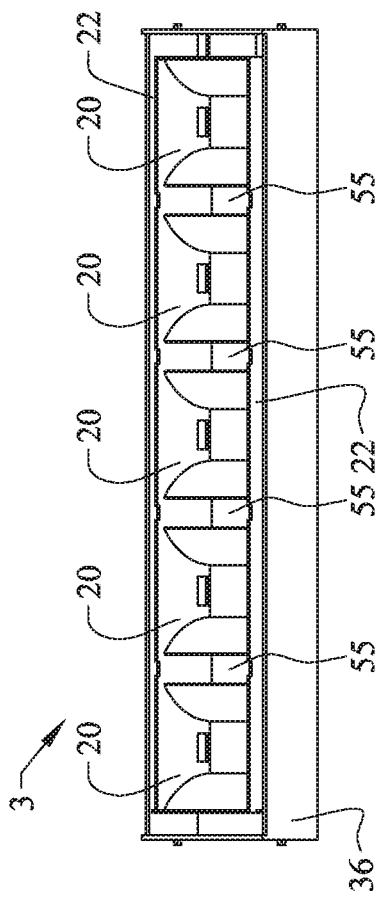
FIG. 9C is a perspective view of a magazine structure of an automated vertical plant cultivation system, in accordance with embodiments.
Figure 9D:
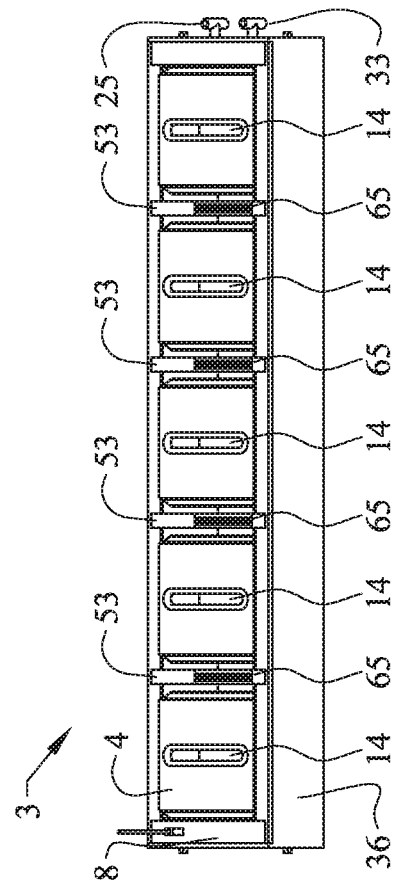
FIG. 9D is a perspective view of a magazine structure of an automated vertical plant cultivation system, in accordance with embodiments.
Figure 9A:
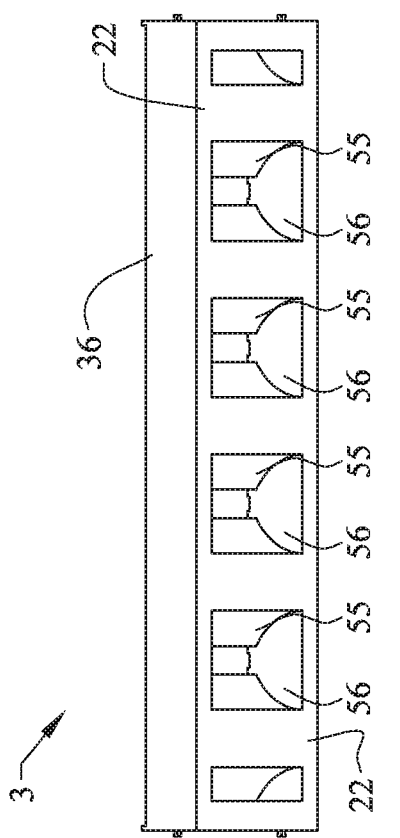
FIG. 9A is a perspective view of a magazine structure of an automated vertical plant cultivation system, in accordance with embodiments.
Figure 9B:
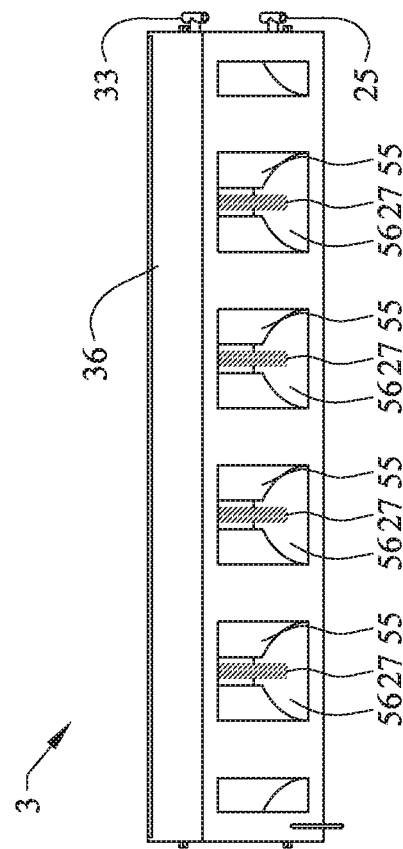
FIG. 9B is a perspective view of a magazine structure of an automated vertical plant cultivation system, in accordance with embodiments.
Figure 10C:
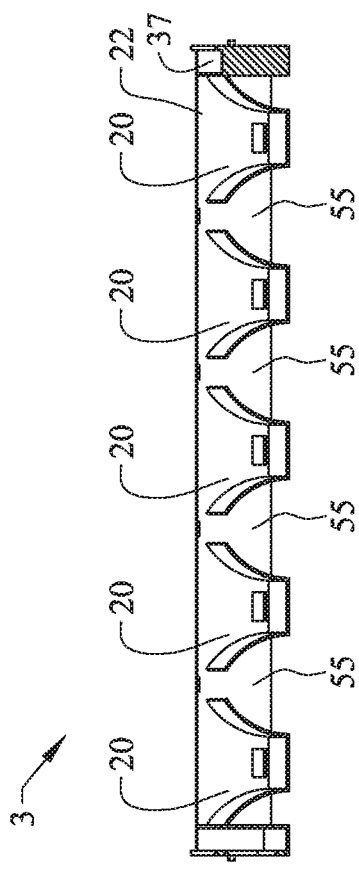
FIG. 10C is a section view of a magazine structure of an automated vertical plant cultivation system, in accordance with embodiments.
Figure 10A:
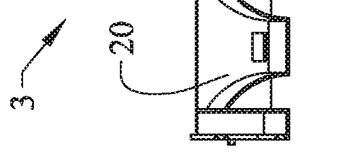
FIG. 10A is a section view of a magazine structure of an automated vertical plant cultivation system, in accordance with embodiments.
Figure 10D:
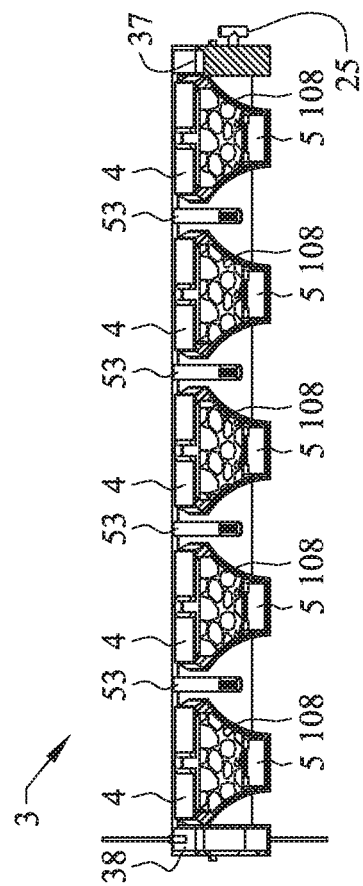
FIG. 10D is a section view of a magazine structure of an automated vertical plant cultivation system, in accordance with embodiments.
Figure 10B:
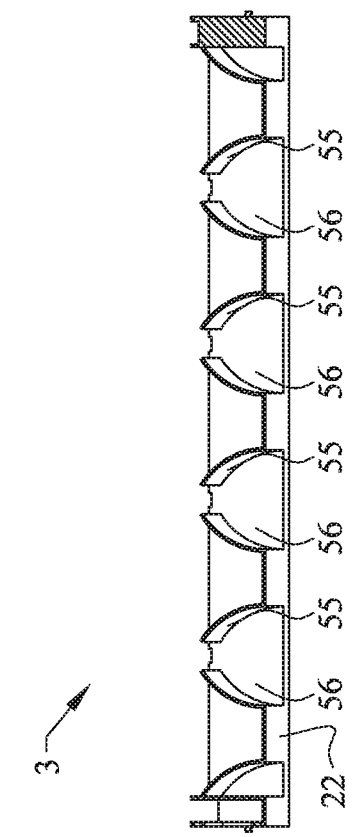
FIG. 10B is a section view of a magazine structure of an automated vertical plant cultivation system, in accordance with embodiments.

The plant/seed capsule (4) is an enclosure made of non-porous material with openings on top and on the bottom. The openings are sealed (110) to air and moisture and are removed prior to the capsule's deployment. The capsule contains one or several seeds of same or different plant (29) species. The seed (17) is embedded in a nutrient composite (16) and is suspended in scaffolding material (108) to enable root structure to establish a firm hold for the plant (29) once the seed (17) germinates. In hydroponic or aeroponic plant cultivation methods, the seed placement is different. FIGS. 5K, 6G and 6L show the seeds inside the plant/seed capsule placed in a sack (107) surrounded by scaffolding material absent nutrients. The production of the nutrient composite (16) employing non-hydroponic or non-aeroponic methods is tightly controlled to provide the correct balance of nutrients for the plant (29) species and protect from any life form including any in a dormant state. The production process reduces or removes moisture content in the composite and in some applications also removes air. At the bottom of the plant/seed capsule (4) for a capsule employing nutrient composite, a root membrane (15) permits fluid (5) to percolate into the capsule and upon seed (17) germination, allows the root system to penetrate the membrane (15) while containing the nutrient composite (16) inside the capsule. The plant/seed capsule (4) cap has a through sprout port through which the plant material sprouts. Some plant/seed capsules may come with several sprout openings. Upon inserting the capsule into the capsule's reservoir, a seal (110) surrounding the capsule's top wall prevents fluid/moisture infiltration.

System Structural Elements

The system is a load bearing assembly containing mechanical, electrical and plant material. FIG. 1A shows the key structural members. The assembly form is typically a square or rectangular. The structural members supporting the assembly include at least two vertical and two horizontal members at the assembly's periphery. The horizontal member at the bottom of the frame typically supports the pump (6), the holding/overflow tank (7), the control panel (41) and other electrical/electronic equipment. The horizontal member on top supports the gravity tank (9). The plant magazines (3) span across the vertical members latching onto them by adjustable fasteners (105). The adjustable fasteners free the magazine to travel vertically and be secured at the desired location. The magazines (3) are structurally rigid supplementing the assembly's overall structural strength. The vertical members may be opaque, or made of a see-through frame. Typically, the fluid's vertical circulatory pipe system travels along one end of the support member/s while the electrical/data vertical circulatory system travels along the other end. A wired or wireless interface panel can be placed on the vertical members' wall. The assembly design rating is for full loading and may include a rating capacity for suspended assemblies.

The plant seed and seedling capsules (4) are nestled inside the magazine's capsule vessels (20). The capsule (4) may be provided having one or several of the following features:

A. A keyed mechanical connector to the magazine (3).
B. A keyed electrical connector to the magazine (3).
C. A keyed electromechanical connector to the magazine (3).
D. A mechanical, electrical or electromechanical capsule identifier enabling the system processor to recognize the type and/or content of the plant capsule (4).
E. A mechanical and/or an electronic means to associate the location of a specific plant capsule (4) with the plant vessel cavity in the magazine (3).
F. A mechanical and/or an electronic means to initiate an activation of a plant capsule (4).
G. At least one seal sealing the magazine (3) content from contact with the exterior environment until ready to be activated.
H. A means to keep track of a capsule's (4) operational time from the moment of activation.
I. A nutrient/s enrichment capsule contained in the plant capsule (4) that enriches plant material which can be dispensed using a time-release mechanism. The capsule can be detachable and replaceable.
J. Anti-fungal, bacteria and/or undesirable odor antiseptic capsule/s (4) that can be dispensed using a time-release mechanism. The capsule (4) can be detachable and replaceable.

Operation of the system (200) activates the plant capsule (4). Upon plant capsule activation, the system's (200) processor becomes aware of the capsule's (4) plant growth cycle. In so doing, it provides optimal nurturing to the plant. The level of care is contingent on the sophistication level of embodiments of the system (200). For example, and without limitation, a plant capsule (4) may contain at least one valve that, through the system's (200) processor, controls the amount of fluid entering into the plant capsule vessel (20) and the duration of how long the fluid remains there. The processor may inform the user about the plant growth cycle, alert when sensing anomalies, and suggest how the plant material can be used when it becomes edible. The processor, if permitted, may also be communicatively coupled to a device in a remote location, engaging the user with suggestions, promotions and chat rooms of other system (200) users. Further, the system may include a dehumidifier in order to ensure that the optimal humidity for particular plants as identified from the keyed capsule to optimize the growth cycle of that particular plant.

The plant capsule (4) size and shape may vary, as well as its plant aperture size and number of its cap openings. The capsule (4) can be fabricated for a one-time use, or can employ a removable cap for multiple uses. A multiple use capsule (4) may enable the replacement of spent plant material with new seed sacks or seedling bundles upon completion of a plant growth cycle. Operable replenished capsules (4) may be provided on a subscription basis where the processor can reset the capsule for a new growth cycle. Similarly, when the unauthorized use of a capsule (4) is detected, the processor may de-activate the capsule's (4) optimization of the plant growth cycle. Under authorized use, plant material inside the capsule (4) receives the optimal amount of fluid, nutrition, and light at the correct spectral wavelength and duration. In addition, sensing devices may be used or a part of the system (200) and in communication with the processor wherein the processor can monitor, alert, and act on invading pests and identify unhealthy changes in the plant foliage in response to information and data provided by the sensing devices.

Additional embodiments may include a miniaturized flying device or drone that may under control or autonomously fly over the system (200) and the plant material, sense blooming flowers and then pollinate the blooming flowers. Additionally, the miniaturized flying device or drone may also sense anomalies in plant foliage and communicate its finding to the processor as it flies over the system (200) and the plant material.

FIGS. 12A-E depict views of the seed or plant capsule which can be used with multi-cultivation methods.

FIG. 12A shows the seed or plant capsule (250) top view with cap plant's aperture (201) opening at its center and the capsule's (250) power/data interface (228) extending outwardly from face of the capsule by the fluid supply channel (206) side (not shown).

FIG. 12B shows the capsule (250) bottom view. At the capsule's (250) fluid supply side wall (219) a capsule valve recess (233), a seed or plant capsule stem pipe bore (235) and the power or power and data chase (225) form an enclosure to house the low voltage fluid supply valve (214), enable a valve pipe stem (215) (not shown) to enter the capsule (250) (not shown) and electrically connect to the capsule's power or power and data interface (228) shown extending from face of capsule outwardly. At the capsule's (250) fluid evacuation side wall (218), a drain port through bolt (211) drains the capsule's (250) fluid when it employs an aeroponic cultivation method. Fluid entering the capsule wets the plant/s root structure and then is evacuated and recycled back to the cultivator's holding tank and then the fluid periodically repeats its circulation cycle. The through drain bolt (211) is capped by the drain port cap (212) when another cultivation method is employed.

FIG. 12C shows the capsule's (250) exterior wall by supply channel (219) side. A recess in the capsule's wall forms an enclosure to house the low voltage fluid supply valve (214) with its power or power and data chase (225). Above the chase an electronic memory device (223) can be embedded in the capsule's housing or inserted to the power and data interface (228). The electronic memory device (223) can be integral to the capsule's (250) body, or securely attached to the body in a secondary fabrication process.

FIG. 12D shows the capsule's (250) exterior wall by the fluid evacuation channel (218) side. At the wall bottom, a drain port through bolt (211) drains the capsules' (250) fluid when employing an aeroponic cultivation method. The through bolt (211) is capped when employing other cultivation methods. Above, an overflow port through bolt evacuates fluid to the fluid evacuation channel (205) when fluid levels exceed a threshold. Also shown is the profile of the cap's plant aperture (201). The seed or plant capsule cap (200) aperture may vary in size and location at the cap's top face based on the selected plant material.

FIG. 12E shows the capsule (250) side elevation. The capsule's power and data interface (228) extends outwardly beyond the face of the capsule's wall at the supply channel (219) side. At the capsule's opposite side by the wall of the evacuation channel (218) the drain port through bolt (211) is shown at the bottom with a cap (212) and above an overflow port through bolt (210).

FIGS. 13A-B show partial perspectives of the fluid supply channel (206) at the low voltage valve (214) inlet and the seed or plant capsule fluid supply side wall (232).

FIG. 13A shows the fluid supply channel (206), the channel cover (222) power/data receptacle (224), conductors (230), the low voltage fluid valve (214) with its power or power and data chase (225) and the valve's pipe stem (215). The valve (214) is secured to the supply channel inner wall by the valve through bolt (220) with a gasket (221) and a nut (226) (not shown). Power entering from the power or power and data chase (225) activates the low voltage valve (214) when sensing device/s (not shown) sense that fluid level inside the seed or plant capsule (250) is low. The valve's activation can be prompted by the processor or by the local sensing device. Fluid then travels through the valve (214) and the pipe stem (215) into the seed or plant capsule (250) (not shown). Delivering fluid inside the capsule above the seed or plant roots prevents the roots from clogging the fluid inlet/s. The pipe stem (215) shown in this figure and section FIG. 15A illustrate the solution. In a different embodiment (not shown) fluid can enter the capsule directly from the fluid supply channel accomplishing the same purpose.

FIG. 13B shows the seed or plant capsule (250) side wall abutting the fluid supply channel (206) inner wall. A recess at the bottom of the wall extending upwardly houses the low voltage fluid supply valve (214) and the power or power and data chase (225). Above the chase recess, at the wall center, the "L"-shaped capsule's power and data interface (228) extends outwardly. The interface establishes power and data connectivity to support the capsule's operation upon engaging its "L" shaped interface leg in the channel cover (222) receptacle (224). The interface can have an electronic memory device (223) storing pertinent information about the capsule's (250) content including OEM authentication data. The capsule's device network supporting its plant cultivation is activated only after the cultivator processor (not shown) authenticates it.

Figure 14A:
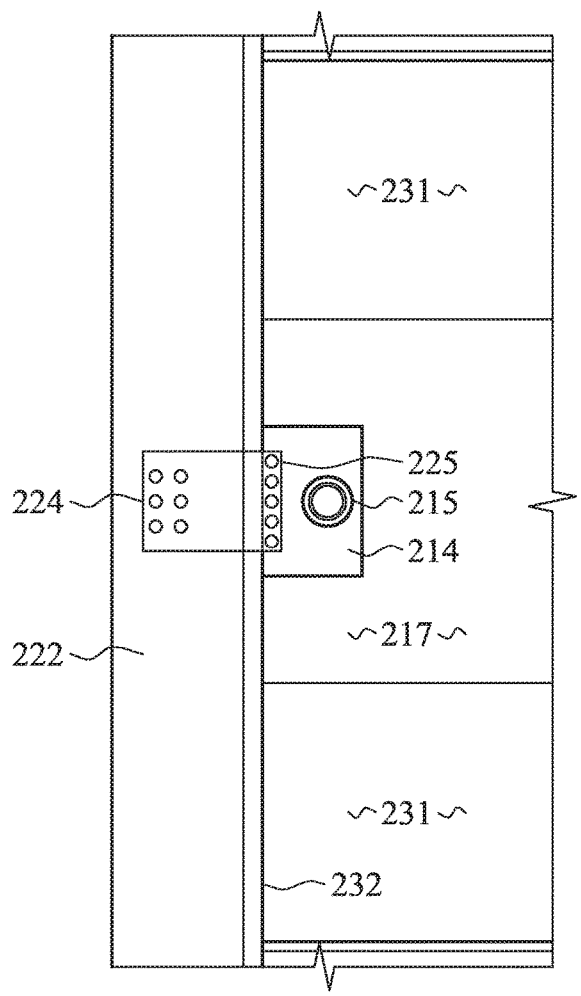
FIG. 14A is a partial top view of a fluid inlet of a seed/plant capsule reservoir, in accordance with embodiments.
Figure 14B:
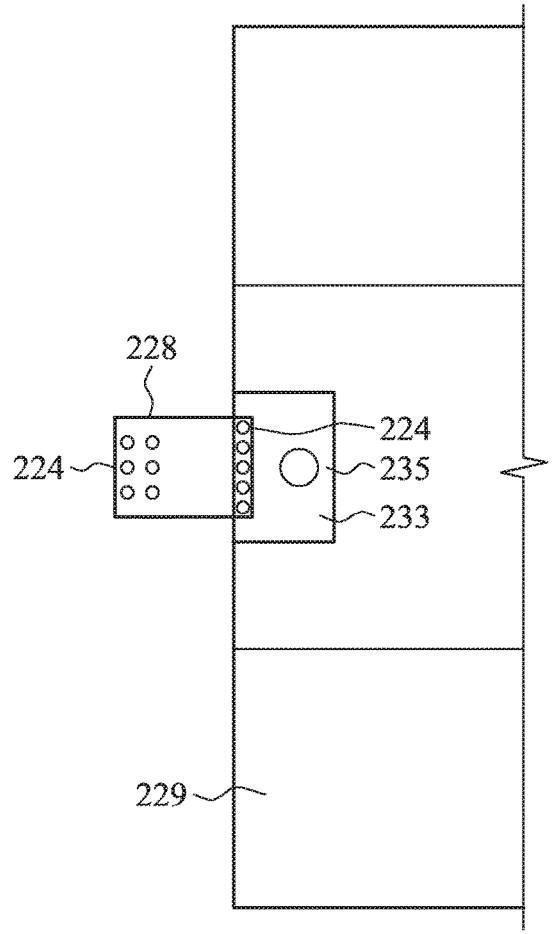
FIG. 14B is a partial bottom view of a fluid inlet of a seed/plant capsule, in accordance with embodiments.

FIGS. 14A-B show a partial top view of the fluid supply channel and a partial bottom view of the fluid supply side of the seed or plant capsule.

FIG. 14A shows the fluid supply cover (222) with a receptacle (224). In this figure, the receptacle (224) engages the "L"-shaped capsule's power and data interface (228) of the seed or plant capsule (250). The channel cover (222) can have a plurality of receptacles (228) engaging different types of devices, including power input devices such as valves, lighting devices and sensing devices such as thermal, fluid pH levels, humidity and light sensors. At the bottom of the seed or plant reservoir (217) abutting the fluid supply channel interior wall (207), the low voltage valve (214) receives power or power flowing from the power or power and data chase (225). The chase can be an integral part of the low voltage valve (214) assembly. Inside the seed or plant capsule's reservoir (217) the low voltage valve (214) delivers fluid into the seed or plant capsule (250) through a pipe's valve stem (215). The stem enters the seed or plant capsule bore (235) located at the capsule's valve recess (233), both shown in FIG. 14B. The pipe's valve stem can include a seal/gasket (216) preventing fluid backflow into the seed or plant capsule's reservoir (229) (not shown).

FIG. 14B shows a partial view of the seed or plant capsule bottom (229) at the fluid supply (206) side. The low voltage valve (215) pipe stem (215) enters the seed or plant capsule (250) through the seed or plant capsule bore (235) located at the capsule's valve recess (233). Extending out from the capsule's wall at supply channel (219) side is the "L"-shaped capsule's power and data interface (228). The interface provides power to the low voltage valve (214) and can communicate with the valve. The memory storage device (223) can be embedded inside the interface (228) or affixed to it (not shown). The storage device (223) authenticates the capsule (250), obtains information and optimizes the capsule's operation.

FIGS. 15A-C show partial longitudinal sections of the seed or plant capsule (250) inside the seed or plant capsule's reservoir (236) at the fluid supply channel (206) side. A low voltage valve (214) controlled by the cultivator processor (not shown) flows fluid from the supply channel (206) to the seed or plant capsule reservoir (236) into the seed or plant capsule (250). The fluid reaches the capsule (250) passing through the valve's through bolt (220) to the valve's piped stem (215) penetrating the seed or plant capsule (250) from below through the capsule's stem pipe bore (235). The fluid level inside the capsule is equalized by barometric pressure with the fluid inside the supply channel (206). A sensing device can provide a signal to the processor when to operate the valve (214). In another embodiment, a simple mechanical device such as a float valve (not shown) can also control the in-flow fluid supply to the capsule (250). The capsule's irrigation method dictates the amount of fluid and the duration of the irrigation into the seed or plant capsule (250). The valve's piped stem (215) can have a pipe stem seal/gasket (216) or such seal can be provided as a self-sealing membrane on top of the capsule's stem pipe bore (235). Either way, the seal or gaskets prevent fluid backflow into the seed or plant capsule reservoir (236). The valve (214) is secured to the inner wall of the fluid supply channel (207) by a valve through bolt (220) with a valve through nut (226) and a gasket (221). The gasket (221) prevents fluid travel into the seed or plant reservoir (236). The "L"-shaped power or power and data chase (225) is shown wedged between the exterior face of the seed or plant capsule (219) and the fluid supply channel interior wall (207). The chase (225) in this embodiment is integral to the low voltage valve (214). In other embodiments it can in part or in whole attach to the reservoir wall (214). In other embodiments the chase can be configured as a part of the capsule's assembly. Upon placement of the capsule (250) inside the seed or plant capsule's reservoir (236) the chase (225) mates with the capsule's power and data interface (228) which in turn mates with a receptacle (224) in the fluid supply cover (222). Power flowing through the channel cover (222) reaches the capsule's embedded memory device (223). Then, the memory device information is transmitted to the processor (not shown) and upon authentication, all network devices associated with the capsule (250) commence operation. A root structure scaffolding (203) is shown inside the seed or plant capsule (250). The scaffolding provides the attachment structure for the plant's roots. The scaffolding could have a volumetric opening to insert seed pouch and/or other time release additives.

FIGS. 15B and 15C show a partial longitudinal section of the seed or plant capsule (250) at the fluid evacuation channel (205) side. An overflow port through bolt (210) above the mid-section of the seed or plant capsule (250) wall abutting the evacuation channel (205) removes access fluid from the capsule when the low voltage valve (214) fails. In such an event, overflowed fluid is evacuated through the channel (205) returning back to the holding tank (not shown) to be re-circulated. When unanticipated fluid circulation occurs, the processor can alert users about the event and may also identify the specific nature of the failure. Below the overflow port through bolt (210), the drain port through bolt (211) evacuates fluid from the seed or plant capsule (250) when needed. This port is typically used when the capsule is operated employing an aeroponic irrigation method. In employing this method, the plants' root (227) are kept moist by circulating fluid and evacuating the fluid from the capsule periodically. When other methods are used, the drain port through bolt (211) can simply be capped off by employing a drain port cap (212). In all irrigation methods during the seed germination period, fluid level inside the capsule is maintained sufficiently high to prompt the seeds to develop their root structure. The capsule (250) design employing a dual port system with the valve pipe stem (215) is an innovation the enables the use of a single capsule design with most common irrigation methods.

Figure 16B:
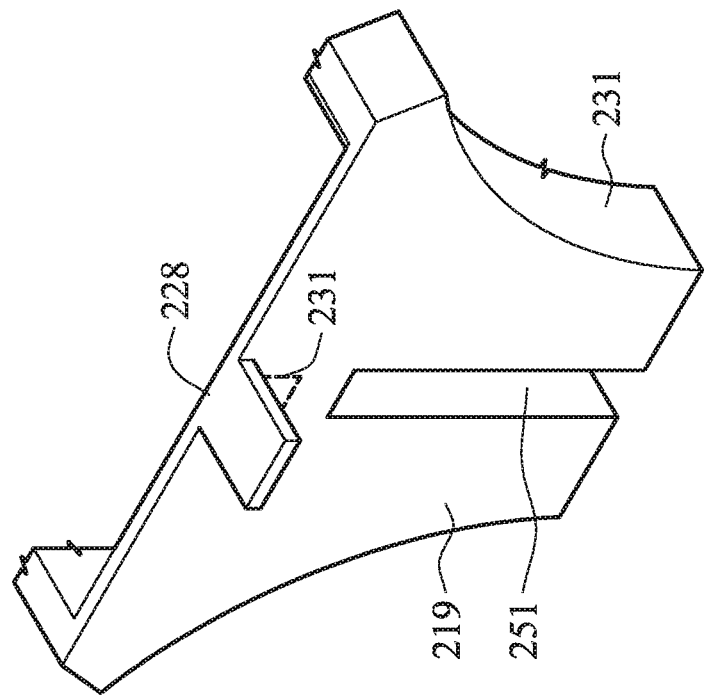
FIG. 16B is a partial perspective view of the fluid inlet side of the seed/plant capsule in accordance with embodiments.
Figure 16A:
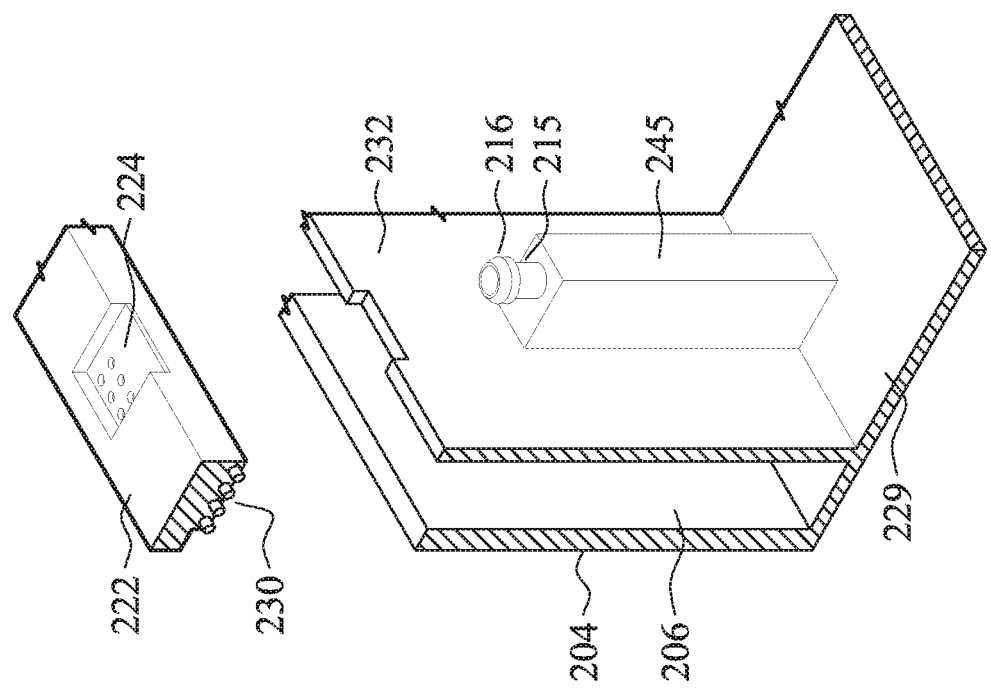
FIG. 16A is a partial perspective exploded view of the fluid inlet of the seed/plant capsule reservoir and the fluid channel cover, in accordance with embodiments.

FIGS. 16A and 16B show a partial section of the fluid supply channel with a view from the seed or plant reservoir side and the side view of the seed or plant capsule at the fluid entry to the capsule side.

FIG. 16A shows the fluid entry stand (245) against the seed or plant capsule fluid supply inner wall (232) with its fluid inlet pipe stem (215) and pipe seal/gasket (216). Fluid entering from the supply channel (206) rises through the fluid inlet pipe stems (215) entering the seed or plant capsule (250). A seal/gasket (216) prevents fluid from returning to the supply channel (206) and/or reservoir (229). The magazine's pipe stems can deliver fluid to all capsules simultaneously or to individual capsules where and when needed.

FIG. 16B shows the supply side face of a seed or plant capsule (250). A fluid inlet stand recess (251) houses the fluid inlet stand (245). When the capsule (250) is placed inside the reservoir the pipe stem (215) penetrates the capsule's (250) interior. A seal/gasket (216) located on the pipe, the capsule or both prevents fluid back flow. The capsule may employ a memory device (231) and a capsule power and data interface (228) (not shown) to control the illumination and fluid circulation of the capsule.

FIGS. 17A, 17B and 17C show partial longitudinal sections across a seed or plant capsule nestled inside a magazine.

FIG. 17A shows a pipe stem (215) originating at the fluid supply channel (206) and terminating inside the seed or plant capsule (250). A membrane seal/gasket (216) is located on the pipe stem stand (215). Fluid from the supply channel (206) enters the capsule's (250) interior above the seeds or plants' root structure. In so doing the roots are prevented from clogging the fluid supply ports. Inside the capsule's (250) fluid supply side wall a fluid sensor probe (257) can be embedded or attached to the wall. The probe in real time communicates data about the moisture level inside the capsule (250) to the processor to insure optimal plant growth fluid level. The seed or plant capsule floor (217) is sloped from the fluid channel supply side toward the fluid evacuation channel (205) side. Regardless of the cultivation methods fluid is prevented from becoming stagnant inside the capsule. The capsule (250) retains the plants in place by employing a root structure scaffolding (203). This 3D structure enables the roots to wrap around the structure membrane and support the growth of sizable plants.

FIGS. 17B and 17C show partial longitudinal sections of the seed or plant capsule (250) at the fluid evacuation channel (205) side. An overflow port through bolt (210) above the mid-section of the seed or plant capsule (250) wall abutting the evacuation channel (205) removes access fluid from the capsule when the low voltage valve (214) (not shown) fails. In such an event, overflowed fluid is evacuated through the channel (205) returning back to the holding tank (not shown) to be re-circulated. When unanticipated fluid circulation is sensed, the processor can alert users about the event and may also identify the specific nature of the failure. Below the overflow port through bolt (210), the drain port through bolt (211) evacuates fluid from the seed or plant capsule (250) when needed. This port is typically used when the capsule is operated employing an aeroponic irrigation method. In employing this method, the plants' roots (227) are kept moist by circulating fluid and evacuating the fluid from the capsule periodically. When other methods are used, the drain port through bolt (211) can simply be capped off by employing a drain port cap (212). In all irrigation methods during the seed germination period, fluid level inside the capsule is maintained sufficiently high to prompt the seeds to develop their root structure. The seed or plant capsule floor (217) shown in this embodiment is sloped to flow fluid toward the drain port through bolt (211). The capsule (250) design employing a dual port system with the valve pipe stem (215) is an innovation which enables the use of a single capsule design with common irrigation methods.

FIGS. 18A, 18B and 18C show partial longitudinal sections across a seed or plant capsule nested inside a magazine.

FIG. 18A shows a pipe stem (215) originating at the fluid supply channel (206) and terminating inside the seed or plant capsule (250). A membrane seal/gasket (216) is located on the pipe stem stand (215). Fluid from the supply channel (206) enters the capsules' (250) interior above the seeds or plants' root structure. In so doing the roots are prevented from clogging the fluid supply port/s. Inside the capsule's (250) fluid supply side wall a fluid sensor probe (257) can be embedded or attached to the wall. In this embodiment fluid entering the magazine is channeled into a multi-port valve (252) (not shown). From there the fluid travels through fluid supply pipes (255) into the capsules (250). The valve (252) may have an integral fluid pipe with power and communication receptacle/s (224) connecting to receptacles on the fluid channel cover (222). A fluid sensor probe (257) can be embedded or attached to the wall. The probe in real time communicates data about the moisture level inside the capsule (250) to the processor to insure optimal plant growth. The seed or plant capsule floor (217) is sloped from the fluid channel supply side toward the fluid evacuation channel (205) side. Regardless of the cultivation methods fluid is prevented from becoming stagnant inside the capsule. The capsule (250) retains the plants in place by employing a root structure scaffolding (203). This 3D structure enables the roots to wrap around the structure membrane and support the growth of sizable plants.

FIGS. 18B and 18C show partial longitudinal sections of the seed or plant capsule (250) at the fluid evacuation channel (205) side. An overflow port through bolt (210) above the mid-section of the seed or plant capsule (250) wall abutting the evacuation channel (205) removes access fluid from the capsule when the low voltage valve (214) fails. In such an event, overflowed fluid is evacuated through the channel (205) returning back to the holding tank (not shown) to be re-circulated. When unanticipated fluid circulation occurs, the processor can alert users about the event and may also identify the specific nature of the failure. Below the overflow port through bolt (210), the drain port through bolt (211) evacuates fluid from the seed or plant capsule (250) when needed. This port is typically used when the capsule is operated employing an aeroponic irrigation method. In employing this method, the plants' roots (227) are kept moist by circulating fluid and evacuating the fluid from the capsule periodically. When other methods are used, the drain port through bolt (211) can simply be capped off by employing a drain port cap (212). In all irrigation methods during the seed germination period, fluid level inside the capsule is maintained sufficiently high to prompt the seeds to develop their root structure. The seed or plant capsule floor (217) shown in this embodiment is sloped to flow fluid toward the drain poet through bolt (211). The capsule (250) design employing a dual port system with the valve pipe stem (215) is an innovation which enables the use of a single capsule design with common irrigation methods.

FIGS. 19A and 19B show longitudinal sections through the fluid supply channel and the magazine.

FIG. 19A shows the multi-port fluid valve or multi-port fluid valve with pump (252) at the magazine (248) fluid entry side. Fluid flowing into the magazine is channeled into the multi-port valve (252) and from there through the fluid supply pipe (255) to enter the seed or plant capsules individually when needed. The multi-port valve (252) can be located inside the fluid channel (206) and powered and communicated to and from the receptacle (224) in the fluid channel cover (222). The multi-port valve (252) may also have an integrated pump. The pump may be included when gravity flow is not used to flow fluid into the magazine (248).

FIG. 19B shows the seed or plant capsule's reservoir (236) at the fluid supply channel wall at the capsule side (232). The fluid inlet stand (245) with the pipe stem (215) and pipe stem seal/gasket (216) enable fluid supply and fluid retention inside the seed or plant capsule (250). A fluid sensor probe (257) not shown) can be embedded or attached to the wall of the fluid inlet stand (245) inside the capsule's reservoir (236). The fluid sensor probe can receive power through the capsule's power and data interface (228) and have bi-directional communication when the capsule (250) is seated inside the capsule's reservoir (236).

FIGS. 20A, 20B and 20C show a cultivation split system assembly whereas in the embodiment shown the magazines are recessed in a wall niche and other power and fluid retaining and pumping equipment are concealed from viewing in remote location/s.

FIG. 20A shows a block diagram of two magazine vertical arrays, each having four magazines powered and fluid supplied from a remote location through a wall (249). In this diagram the processor (243) and the fluid tank/s (249) provide for a plurality of cultivators from a remote location. In addition, other system components can interchange with the aforementioned components and be placed remotely. These components may include power back-up supply, transceiver, sensing devices, oxygenator, filtering devices and heating/cooling equipment.

FIG. 20B shows a wall (249) niche with four magazines (248) occupying the recessed niche space. The magazines (248) are showing plant material (244), floor slab (239) and tile ceiling (238). Also shown is a horizontal section 16c with a view looking down onto a magazine (248) inside the niche.

FIG. 20C shows a horizontal section looking down onto a magazine (248) inside a wall (249) niche. The magazine (248) in this embodiment is supported by four wall mounting brackets (240) with fluid vertical circulatory piping (241) running on one side of the magazine and power/data conductors (242) running vertically on the other side. The magazine (248) shows five seed or plant capsules (250) with each having a single plant aperture (201) and four magazine heat dissipating vents (246). In this embodiment both systems are concealed from direct viewing. In a different embodiment the magazine can be mounted against the wall supported by wall brackets (not shown).

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An automated vertical plant cultivation system comprising:
   a structure including a plurality of fixed self-supported magazines for plant cultivation configured to convey fluid to a plurality of seed or plant capsules nestled inside each of the plurality of fixed self-supported magazines and convey power to a power-consuming device coupled to each of the plurality of fixed self-supported magazines,
   wherein the power-consuming device is at least one light source,
   wherein each of the fixed self-supported magazines is communicatively coupled to a processor and at least one of a memory device, an Internet of Things (IOT) device, a transceiver, and a power supply,
   wherein at least one of the seed or plant capsules has a unique identifier and a unique electronic address and is communicatively coupled to the processor,
   wherein, in response to a signal or a command, the processor is configured to identify the seed or plant capsule and a location of the seed or plant capsule within the fixed self-supported magazine and control operation of the seed or plant capsule, and
   wherein, to control operation of the seed or plant capsule, the processor is configured to at least one of:
   authenticate the seed or plant capsule with an original equipment manufacturer (OEM) system,
   identify a unique address associated with the seed or plant capsule,
   authorize the seed or plant capsule to join a communication network used by at least one of the processor, the memory device, the IOT device, the transceiver, and the power supply,
   identify a location of the seed or plant capsule location in the magazine,
   retrieve care instructions associated with a seed or plant of the seed or plant capsule,
   set parameters for controlling seed or plant capsule,
   identify a date of manufacture of the seed or plant of the seed or plant capsule, and
   identify a date of expiration of the seed or plant of the seed or plant capsule date.

2. The system of claim 1, wherein the seed or plant capsule includes a tamper proofing device, and wherein the processor is configured to, in response to a signal from the temper proofing device indicating that tempering with at least one of the seed or plant capsules has been detected, disable communication with the at least one of the seed or plant capsules.

3. The system of claim 1, wherein the processor is configured to identify a location of each of the plurality of fixed self-supported magazines and control circulation of fluid and flow of power and data thereto.

4. The system of claim 1, further comprising a moisture sensor probe disposed inside each of the plurality of seed or plant capsules, wherein the moisture sensor probe is communicatively coupled to the processor and is configured to measure a moisture level and communicate data representative of the moisture level to the processor.

5. The system of claim 1, further comprising a dedicated fluid valve, wherein the processor is configured to control the dedicated fluid valve to convey fluid to the plurality of seed or plant capsules nestled inside each of the plurality of fixed self-supported magazines.

6. The system of claim 5, wherein each of the plurality of seed or plant capsules defines an overflow fluid outlet port and a drain port and is configured to receive irrigation using one of an aeroponic cultivation irrigation method, a hydroponic cultivation irrigation method, and a conventional cultivation irrigation methods.

7. The system of claim 6, wherein, to provide irrigation using aeroponic cultivation irrigation method, the processor is configured to control a valve disposed at the overflow fluid outlet port to retain fluid in each of the seed or plant capsules through a seed germination period and periodically evacuate the fluid through the drain port to air roots of a plant within the seed or plant capsule.

8. The system of claim 6, wherein receiving irrigation using one of the hydroponic cultivation irrigation method and the conventional cultivation irrigation method includes sealing the drain port of each of the seed or plant capsules to prevent draining of fluid therethrough.

9. The system of claim 1, wherein the seed or plant capsule includes a visible indicator located on an exterior surface, and wherein the visible indicator displays a condition of the seed or plant of the seed or plant capsule.

10. The system of claim 1, wherein the processor is configured to control operation of individual capsules of the plurality of seed or plant capsules.

\* \* \* \* \*